(12) United States Patent
Nonaka et al.

(10) Patent No.: US 6,859,790 B1
(45) Date of Patent: Feb. 22, 2005

(54) DATA DISTRIBUTION SYSTEM AND METHOD THEREOF, DATA PROCESSING DEVICE, DATA CONTROL DEVICE, AND MACHINE-READABLE RECORDING MEDIUM RECORDING DISTRIBUTION DATA

(75) Inventors: Akira Nonaka, Kanagawa (JP); Tadashi Ezaki, Tokyo (JP)

(73) Assignee: Sony Corporation, Tokyo (JP)

( * ) Notice: Subject to any disclaimer, the term of this patent is extended or adjusted under 35 U.S.C. 154(b) by 585 days.

(21) Appl. No.: 09/691,410

(22) Filed: Oct. 18, 2000

(30) Foreign Application Priority Data

Oct. 20, 1999 (JP) .......................................... 11-298921

(51) Int. Cl.[7] .............................................. G06T 17/60
(52) U.S. Cl. ............................ 705/51; 705/1; 705/51; 705/55; 705/57; 380/3; 380/4; 380/255; 707/9; 707/65; 713/189; 713/193; 713/194
(58) Field of Search ................................ 705/51, 1, 55, 705/57; 380/3, 4, 255; 707/65, 9; 713/189, 193, 194

(56) References Cited

U.S. PATENT DOCUMENTS

| | | | | |
|---|---|---|---|---|
| 5,715,403 A | * | 2/1998 | Stefik ............................ | 705/44 |
| 5,825,883 A | * | 10/1998 | Archibald et al. ............. | 705/53 |
| 6,016,509 A | * | 1/2000 | Dedrick ....................... | 709/224 |
| 6,233,684 B1 | * | 5/2001 | Stefik et al. ................. | 713/176 |
| 6,289,455 B1 | * | 9/2001 | Kocher et al. ............... | 713/194 |
| 6,341,273 B1 | * | 1/2002 | Briscoe ........................ | 705/41 |

FOREIGN PATENT DOCUMENTS

| | | | | |
|---|---|---|---|---|
| JP | 2002230428 A | * | 8/2002 | ............. G06F/7/60 |

OTHER PUBLICATIONS http://www.vector-networks.com/pcduo-enterprise/datasheets/Software_Metering.pdf.*

* cited by examiner

*Primary Examiner*—James P. Trammell
*Assistant Examiner*—J Winter
(74) *Attorney, Agent, or Firm*—Frommer Lawrence & Haug LLP; William S. Frommer

(57) ABSTRACT

A contents provider stores contents data in a container in a format which can only be decoded with a key distributed from an EMD service center, and transmits the container to a service provider. The service provider adds pricing information and the like and distributes this to a user home network. The user home network pays charges to the EMD service center based on the pricing information, receives the key, and decodes the contents data. Information regarding the number of times which copying is permitted is contained in the secure container, and the number of times permitted is increased each time charges are paid, thereby enabling copying to other media and the like. It is impossible to make copies from a container simply copied, or in cases where in the number of permitted times of copies has been used up. Thus, contents data can be distributed in a format wherein copying of contents data can be controlled including the number of copies made.

36 Claims, 34 Drawing Sheets

FIG. 3

| ID | SETTLEMENT PROCESSING | REGISTRATION | CONNECTION TO EMD SERVICE CENTER |
|---|---|---|---|
| 0000000000000001h | PERMITTED | PERMITTED | PERMITTED |
| 0000000000000002h | PERMITTED | PERMITTED | NOT PERMITTED |
| 0000000000000003h | PERMITTED | NOT PERMITTED | PERMITTED |
| 0000000000000004h | PERMITTED | NOT PERMITTED | NOT PERMITTED |
| 0000000000000005h | NOT PERMITTED | PERMITTED | PERMITTED |
| 0000000000000006h | NOT PERMITTED | PERMITTED | NOT PERMITTED |
| 0000000000000007h | NOT PERMITTED | NOT PERMITTED | PERMITTED |
| 0000000000000008h | NOT PERMITTED | NOT PERMITTED | NOT PERMITTED |
| 0000000000000009h | PERMITTED | PERMITTED | PERMITTED |
| .... | | | |
| FFFFFFFFFFFFFFEh | PERMITTED | NOT PERMITTED | NOT PERMITTED |
| FFFFFFFFFFFFFFFh | NOT PERMITTED | PERMITTED | PERMITTED |

DATA DISTRIBUTION SYSTEM AND METHOD THEREOF, DATA PROCESSING DEVICE, DATA CONTROL DEVICE, AND MACHINE-READABLE RECORDING MEDIUM RECORDING DISTRIBUTION DATA

BACKGROUND OF THE INVENTION

1. Field of the Invention

The present invention relates to a data distribution system and data distribution method capable of distributing arbitrary data relating to copyrighted material such as music copyrighted material and picture copyrighted material for example, while performing appropriate copy control such as appropriate billing, to a data recording/playing device used for such a system, a data processing device used with such a device, a data use control device used with such a data processing device for realizing the above copy control, and a machine-readable recording medium on which is recorded distribution data which enables such data distribution.

2. Description of the Related Art

The Serial Copy Management System (SCMS) which is the IEC (International Electrotechnical Commission) stipulation agreed upon at the time of introducing Digital Audio Tape (DAT) into the marketplace has long been, and currently still is, widely used as a copy control method for digital output of digital equipment.

The SCMS is made up of a copy control bit and a category code.

The copy control bits are bits representing the state whether or not the contents can be copied, and the category code are bits representing the path, of from what sort of media or what sort of network the contents were previously recorded.

The copy control bits are made up of two bits, and the combinations of these two bits make for the four modes shown in Table 1, whereby copy control is carried out.

TABLE 1

| | |
|---|---|
| 0, 0 | Copy Free |
| 0, 1 | No More Copies |
| 1, 0 | Copy One Generation |
| 1, 1 | Never Copy |

Other various copy control methods are being considered besides SCMS, but consideration is being given to as much SCMS-compatibility as possible, in order to deal with the massive SCMS infrastructure built so far.

For example, the CCI (Copy Control Information) and CGMS-A/D (Copy Generation Management System) being considered by the CPTWG (Copy Protection Technical Working Group) which is an operation organization of the copyright-related industry started to deal with DVD-ROM copyright protection issues, and the EMI-CCI (Encryption Mode Indicator-CCI) used with the 1394CP (Content Protection) which is a copyright protection measure for inter-equipment (home electronics) digital interfaces, but all of these end up simply changing the names of the SCMS copy control bits and continuing to use the same.

FIG. 34 is a diagram illustrating the flow (series) of copies being made according to the SCMS. As can be clearly understood from FIG. 34, SCMS basically follows the logic of allowing copies to be made from a parent generation to child generations, but forbids copying from child generations to grandchild generations. Accordingly, copies can be made infinitely from parent generations to child generations.

Note that in the following description, these terms shall be understood to apply: the series in the direction from parent to child to grandchild shall be referred to as "serial generations", and the series in the sideways direction from the parent shall be referred to as "parallel generation".

It can be conceived that the reason that infinite copying is permitted in the parallel generation direction is so that the individual who has purchased the ROM media can make many copies for personal use, such as for portable devices, car-mounted devices, and so forth, and in fact, many individuals do use the system in such a manner.

Now, rapid digitizing of broadcast networks, communication networks, and home electronics has necessitated the advent of high-level technology such as encryption technology and electronic watermarking technology, as a system to protect copyrights of digital contents. Further, the present state has reached a point which SCMS cannot deal with, even as a system to control copying.

Specifically, the following problems with copy control have been pointed out by the copyright ing side of music copyright material for example, and countermeasures are awaited.

Note here that the term "copyrighting side" is an blanket term including record companies, copyright holders (music writers, lyric writers, arrangers, etc.), adjacent copyright holders (performers, producers and production companies, record companies, etc.), and right-related groups (JASRAC, which is a copyright monitoring organization, SARAH, which is a private recording council, etc.), and so forth.

First, the copyrighting side has pointed out the problem that (1) copying of rented packaged media that has been legally purchased cannot be limited.

For example, in the event that one legally purchases a packaged media and lends it to a friend, the friend is capable of making as many copies as he/she wants to, to his/her recording media. Lending the packaged media to multiple friends allows each of them to make an infinite number of copies to their recording media. Moreover, in the event that one legally purchases a packaged media and copies this to a recording medium, and distributes this to a friend, the friend can obtain the contents for free.

Such a state amounts to great damages for the copyrighting side, and there are requests to restrict such copying, so that in the above example all of the friends would purchase packaged media legally.

Also, the copyrighting side has pointed out the problem that (2) copying of packaged media rented from rental businesses cannot be sufficiently limited.

The copyrighting side has been imposing and collecting a monetary amount based on the sales of rental businesses, but in fact copies are being made one after another from the rented media in the manner described above, and there are requests to fundamentally limit this. Also, it has been pointed out that rental CDs, and CD singles in particular, are often inexpensively recorded onto tapes and MDs for portable devices, so the price of legally-sold CD singles in record shops tends to appear excessively high in the eyes of users, which is also an indirect disadvantage.

Also, there are requests to (3) restrict one-to-many simultaneous copying (simultaneously copying from one to multiple of the same type of media). This is because it is highly inconceivable that simultaneously copying from one to multiple media of the same type would occur in normal home use, and that such type of copying is most likely performed for commercial use.

Further, there are requests to (4) restrict one-to-many copying over time (copying from one to multiple of the same type of media, one after another). This is because it is highly inconceivable that making dozens of the same copy would occur with making private copies, and that such type of copying is most likely performed for commercial use.

Such various types of problems regarding copy control of digital contents are being pointed out from the copyrighting side, and it should be noted that each of these problems arise from the fact that the SCSM permits an infinite number of copies to be made in parallel generations.

Problem (1) arises from individuals purchasing ROM packaged media and copying this to RAM media for distributing to friends for free, or lending the ROM media for the friends to make their own copies. Copying in parallel generations had been originally permitted for media purchasers to make private copies, but unlimited copying in parallel generations is allowed since there is no way to tell whether a copy is being recorded for the media purchasers use or other wise, thus resulting in the current phenomena.

Problem (2) is the same, with the owner of the ROM media being the rental record business, which operate by allowing multiple undefined individuals to make recordings onto RAM media. This problem also comes from the fact that infinite numbers of copies can be made in the parallel generation direction.

This also holds with problems (3) and (4), for making many commercial copies from one, whether simultaneously or over a period of time.

Now, such problems could be solved simply be limiting the number of copies for parallel generations. However, severely restricting the number of copies for parallel generations would lead to voiding the already-had rights of users to make private copies.

SUMMARY OF THE INVENTION

Accordingly, it is an object of the present invention to provide a data distribution system and method thereof capable of distributing arbitrary data such as data relating to copyrighted material such as music copyrighted material and picture copyrighted material for example, while performing appropriate copy control such as appropriate billing, for both serial generations and parallel generations.

It is another object of the present invention to provide a data processing device capable of using distributed arbitrary data such as data relating to copyrighted material such as music copyrighted material and picture copyrighted material for example, while performing appropriate copy control such as appropriate billing, for both serial generations and parallel generations.

It is a further object of the present invention to provide a data use control device which is mounted to a data processing device or the like, and is capable of using distributed arbitrary data such as data relating to copyrighted material such as music copyrighted material and picture copyrighted material for example, while performing appropriate copy control such as appropriate billing, for both serial generations and parallel generations.

It is yet another object of the present invention to provide a machine-readable recording medium on which is recorded distribution data, containing arbitrary contents data such as data relating to copyrighted material such as music copyrighted material and picture copyrighted material for example, capable of being used while performing appropriate copy control such as appropriate billing, for both serial generations and parallel generations.

To this end, the data distribution system according to the present invention comprises:

a data distributing device which adds to desired contents data which is the object of distribution use control information containing information of the number of permitted times of use, which is the number of times that arbitrary use including either one or both of recording and playing the contents data is to be permitted and generates distribution data; and a data processing device which, based on the information of the number of permitted times of use of the contents data of the generated distribution data, detects whether or not the use of the contents data is permitted, uses the contents data in the event that use thereof is permitted, and updates the use control information so as to decrease the number of permitted times of use based on the usage.

Also, the data distribution method according to the present invention:

adds to desired contents data, in a manner wherein external operation is impossible;
use control information containing information of the number of permitted times of use, which is the number of times that arbitrary use of the contents data including either one or both of recording and playing the contents data is to be permitted, and generates distribution data;

distributes the distribution data to a desired distribution destination;

detects whether or not the use of the contents data of the distribution data is permitted, based on the use control information of the distributed distribution data, at the distribution destination;

uses the contents data in the event that use thereof is permitted as the result of the detection; and updates the use control information so as to decrease the number of permitted times of use according to the usage.

Also, the data processing device according to the present invention comprises:

control information extracting means for extracting, from distribution data wherein use control information containing information of the number of permitted times of arbitrary use of the contents data including either one or both of recording and playing the contents data has been added to desired contents data, information of the number of permitted times of use from the use control information;

use permitting means for detecting whether or not use of the content data is permitted, based on the extracted information of the number of permitted times of use;

use control means for controlling the use so as to use the contents data in the event that use thereof is permitted as the result of the detection;

using means for using the contents data based on the control; and control information updating means for updating the use control information so as to decrease the number of permitted times of use, based on the usage.

Also, the data use control device according to the present invention is provided to a device which uses the contents data of distribution data wherein use control information containing information of the number of times that arbitrary use of the contents data including either one or both of recording and playing the contents data is to be permitted, is added to desired contents data to be distributed;

the data use control device comprising:

control information extracting means for extracting, from the distributed distribution data, information of the number of permitted times of use of the use control information;

use permitting means for detecting whether or not use of the content data is permitted, based on the extracted information of the number of permitted times of use;

use control means for controlling use so as to use the contents data in the event that use thereof is permitted as the result of the detection; and control information updating means for updating the use control information so as to decrease the number of permitted times of use, based on the usage, in the event that the contents data is used.

Also, the machine-readable recording medium according to the present invention records distribution data wherein use control information containing information of the number of times that arbitrary use of the contents data including either one or both of recording and playing the contents data is to be permitted has been added to desired contents data.

DETAILED DESCRIPTION OF THE DRAWINGS

FIG. 3 is a diagram illustrating a specific example of a user administration database stored in the user administration unit of the EMD service center shown in FIG. 2;

DESCRIPTION OF THE PREFERRED EMBODIMENTS

An embodiment of the present invention will be described with reference to FIGS. 1 through 33. An EMD (Electronic Music Distribution) system which distributes digital music data will be used as an example in the present embodiment to described the present invention.

Figure 1:
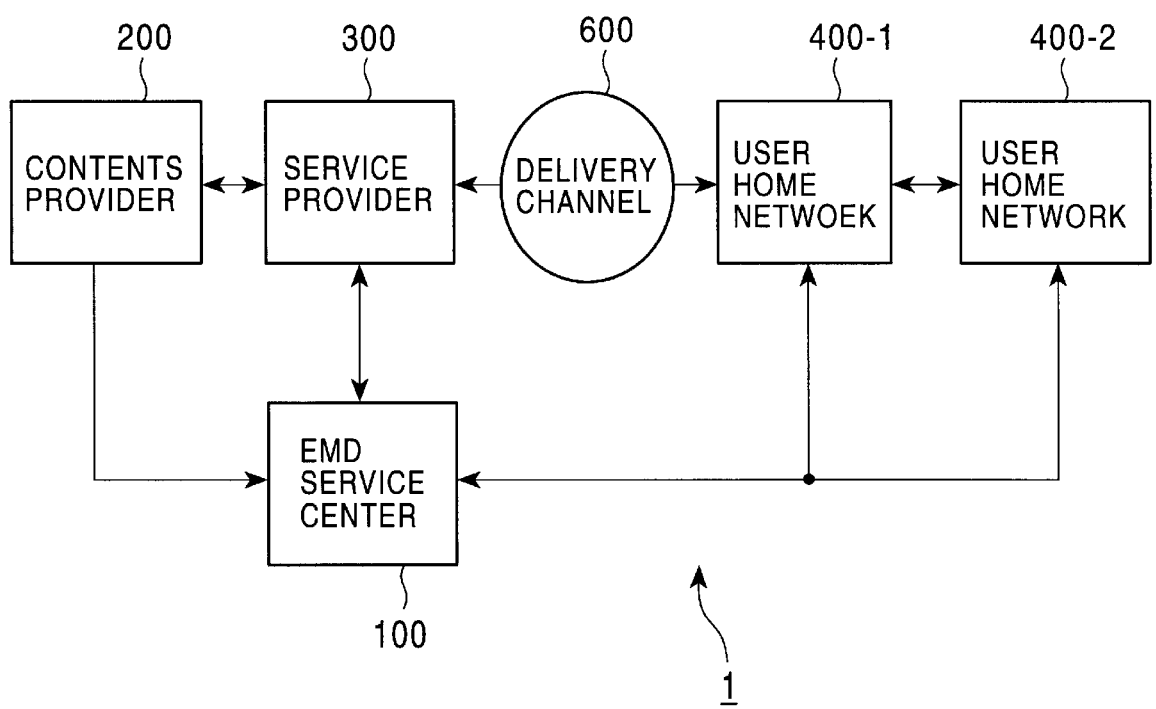
FIG. 1 is a block diagram illustrating the configuration of the EMD system according to an embodiment of the present invention.

FIG. 1 is a block diagram illustrating the configuration of the EMD system according to the present embodiment. The EMD system 1 has an EMD service center 100, a contents provider 200, a service provider 300, a user home network 400, and a delivery channel 600. Now, to clarify one aspect in FIG. 1 for later purposes, FIG. 1 shows two user home networks $400_{-1}$ and $400_{-2}$, for the user home network, but these user home networks may simply be referred to as "user home network 400".

First, description will be made regarding the configuration of the components.

The EMD service center 100 distributes key data to the contents provider 200 and the user home networks $400_{-1}$ and $400_{-2}$, for encoding contents data and decoding the code, thereby enabling distribution of contents, and also controls the distribution of the contents. At this time, the EMD service center 100 receives information from the user home networks $400_{-1}$ and $400_{-2}$ relating to billing according to use of contents, performs settlement of usage charges, and distributes profits to the contents provider 200 and the service provider 300.

Figure 2:
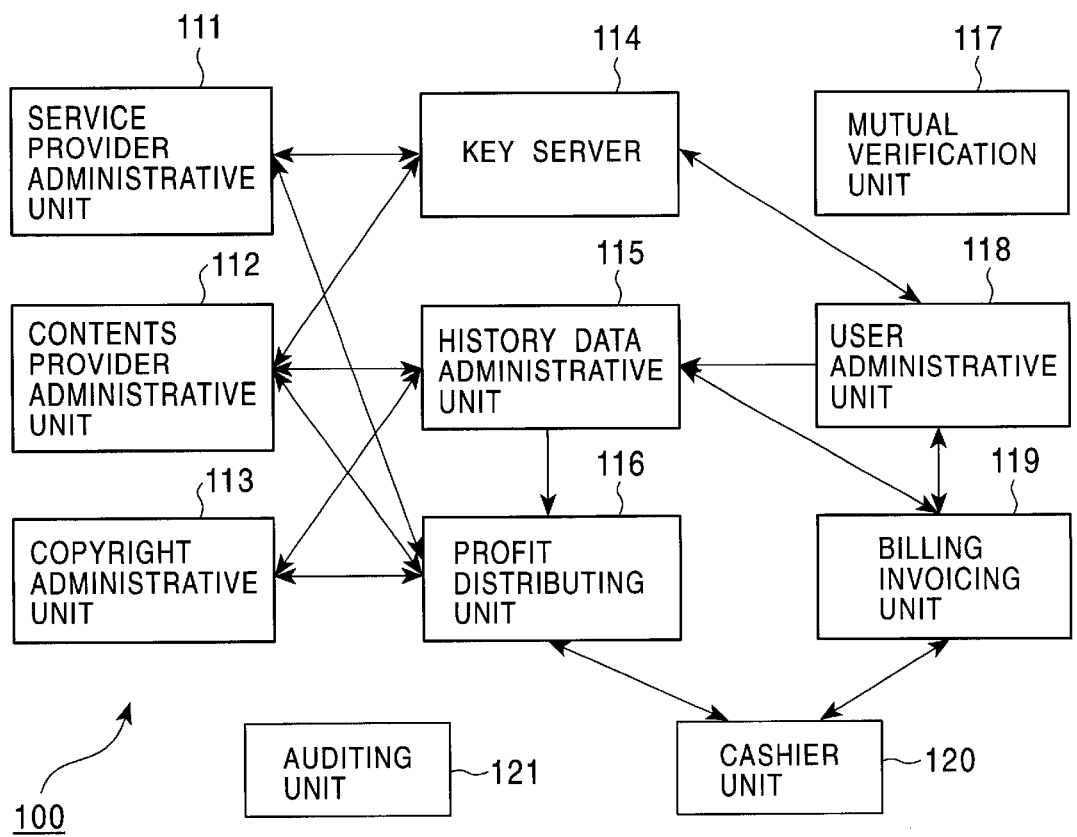
FIG. 2 is a block diagram illustrating the configuration of the EMD service center of the EMD system shown in FIG. 1.

The configuration of the EMD service center 100 will be described with reference to FIG. 2.

The EMD service center 100 has a service provider administrative unit 111, a contents provider administrative unit 112, a copyright administrative unit 113, a key server 114, a history data administrative unit 115, a profit distributing unit 116, a mutual verification unit 117, a user administrative unit 118, a billing invoicing unit 119, a cashier unit 120, and an auditing unit 121.

The service provider administrative unit 111 transmits the distributing key supplied from the key server 114 to the service provider 300, and allows encoded information such as that indicating the handling policy attached to the contents provided from the contents provider 200, to be deciphered at the service provider 300, for example. Also, the information of use background of contents by the user home networks $400_{-1}$ and $400_{-2}$ stored in the history data administrative unit 115, and information of profit distribution based on the use background provided from the profit distributing unit 116, are provided to the service provider 300.

The contents provider administrative unit 112 transmits the distributing key supplied from the key server 114 to the contents provider 200, thereby allowing various types of information for distributing contents to be encoded. Also, the information of use background of contents by the user home networks $400_{-1}$ and $400_{-2}$ stored in the history data administrative unit 115, and information of profit distribution based on the use background provided from the profit distributing unit 116, are provided to the contents provider 200.

The copyright administrative unit 113 transmits the information of use background of contents by the user home networks $400_{-1}$ and $400_{-2}$ stored in the history data administrative unit 115, and information of profit distribution based on the use background provided from the profit distributing unit 116, to organizations and the like managing copyrights, when suitable.

The key server 114 generates and stores distributing keys, and supplies the distributing keys to the contents provider 200, service provider 300, and user home networks $400_{-1}$ and $400_{-2}$ via the service provider administrative unit 111, contents provider administrative unit 112, and user administrative unit 118.

The distribution key is sequentially validated and updated every certain period, such as once a month, and the key server 114 generates and stores several months worth of distributing keys, and transmits several months worth together to the contents provider 200, service provider 300, and user home networks $400_{-1}$ and $400_{-2}$.

The administrative unit 115 stores information indicating background of use of contents at the user home networks $400_{-1}$ and $400_{-2}$, pricing information corresponding to the contents, billing information for the use thereof, handling policy for the contents, etc, input via the user administrative unit 118, and provides this to the service provider administrative unit 111, contents provider administrative unit 112, copyright administrative unit 113, profit distributing unit 116, and billing invoicing unit 119, at suitable timing.

The profit distributing unit 116 calculates the profits of the EMD service center 100, the contents provider 200, and the service provider 300, based on information such as the background of use of information, pricing information, billing information, obtaining information, etc., provided from the history data administrative unit 115.

The mutual verification unit 117 executes mutual verification in the event of performing various types of communication with the predetermined equipment of the contents provider 200, the service provider 300, and the user home networks $400_{-1}$ and $400_{-2}$.

The user administrative unit 118 has a user registration database, and manages the equipment of the user home networks $400_{-1}$ and $400_{-2}$.

FIG. 3 shows a specific example of the user registration database.

As shown in FIG. 3, the user registration database has the unique ID of the equipment of the user home networks $400_{-1}$, and $400_{-2}$ correlated and stored with information such as, whether or not registration can be made, whether or not connection can be made, whether or not settlement can be made, and so forth.

The information of whether or not registration can be made indicates whether or not the contents can be used, and for example, in the event that there is a request for registration from equipment in the user home networks $400_{-1}$ and $400_{-2}$, the user registration database is searched, and depending on the recorded contents thereof, the equipment is registered or registration thereof is denied. This information of whether or not registration can be made is continuously updated, based on information such as whether there have been any unpaid bills or unauthorized processing, etc., provided from settlement firms such as banks and credit companies, the service provider 300, and so forth. Accordingly, the user administrative unit 118 denies registration of equipment having an ID which has been recorded to be registration not available, due to unpaid bills for example, and subsequently this equipment cannot use contents.

Also, the information of whether or not connection can be made indicates whether or not the equipment can connect to the EMD service center 100. Equipment which cannot connect transfers information such as billing information for example, via other equipment of the user home networks $400_{-1}$ and $400_{-2}$.

Also, information of whether or not settlement can be made indicates just that; whether that equipment can make settlement or not. In the event that one user home network $400_{-1}$ or $400_{-2}$ comprises multiple pieces of equipment capable of using contents, at least one of these must be equipment capable of settlement. This equipment transmits the use information, billing information, pricing information, and obtaining policies, for all equipment in the user home networks $400_{-1}$ and $400_{-2}$ registered in the user registration database, to the EMD system 1.

Also, the user administrative unit 118 transmits distributing keys to the equipment in the user home networks $400_{-1}$ and $400_{-2}$ supplied from the key server 114, so that the equipment can decipher encoded contents supplied from the service provider 300. Also, information indicating the background of use of contents at the user home networks $400_{-1}$ and $400_{-2}$, pricing information corresponding to the contents, billing information for the use thereof, and handling policy for the contents, input from the user home networks $400_{-1}$ and $400_{-2}$, is stored in the history data administrative unit 115 as suitable.

The billing invoicing unit 119 calculates the amount to bill the user, based on the billing information, pricing information, and handling policy, provided from the history data administrative unit 115, and notifies the cashier unit 120 thereof.

The cashier unit 120 performs communication with unshown external settlement firms, based on the billing information to the user notified by the billing invoicing unit 119, and the profits distribution amount to the EMD service center 100, the contents provider 200, and the service provider 300, notified from the profit distributing unit 116, and performs settlement processing.

The auditing unit 121 audits the validity of the information of the background of use of contents, billing information, pricing information, and handling policy, supplied from the equipment of the user home networks $400_{-1}$ and $400_{-2}$.

This concludes description of the configuration of the EMD service center 100.

The contents provider 200 is an owner and supplier of digitized contents data, and operates in cooperation with the EMD service center 100 to perform actions such as, for example, superimposing electronic watermarks for proving that contents are its own contents, compressing the contents data, encoding the same, adding various types of necessary information to generate distribution data, and transmitting the distribution data to the service provider 300.

Figure 4:
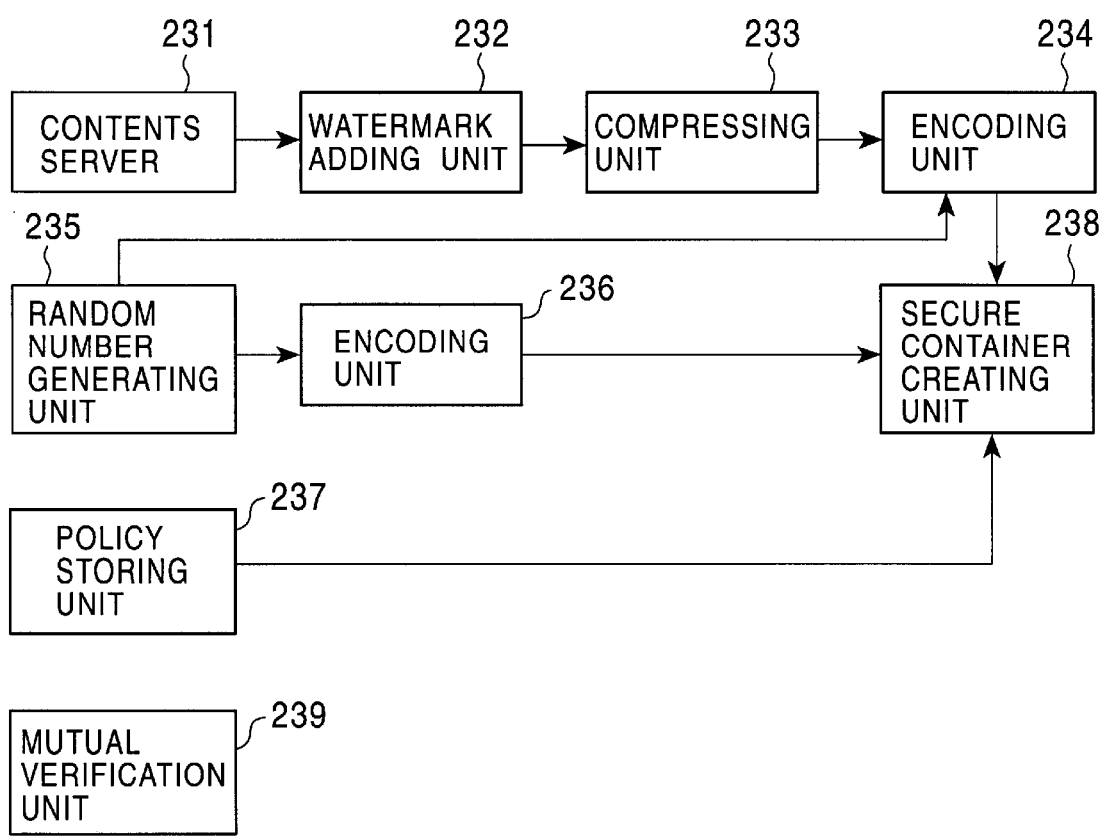
FIG. 4 is a block diagram illustrating the configuration of a contents provider of the EMD system shown in FIG. 1.

The configuration of the contents provider 200 will be decried with reference to FIG. 4.

The contents provider 200 comprises a contents server 231, a watermark adding unit 232, a compressing unit 233, a encoding unit 234, a random number generating unit 235, an encoding unit 236, a policy storing unit 237, a secure container creating unit 238, and a mutual verification unit 239.

The contents server 231 stores digital data which is the original data of arbitrary contents to be supplied.

The watermark adding unit 232 adds an electronic watermark to the data read out from the contents server 231 as data to be distributed, and outputs this to the compressing unit 233.

The compressing unit 233 compresses the contents data supplied from the watermark adding unit 232, and outputs this to the encoding unit 234. With the present embodiment, the compressing unit 233 performs compressing using ATRAC2 (Adaptive Transform Acoustic Coding 2).

The encoding unit 234 encodes the contents data compressed at the compressing unit 233 using random numbers input from the encoding unit 234 as a key (hereafter, this key will be referred to as a "contents key") with an arbitrary shared key method, and outputs this to the secure container creating unit 238. With the present embodiment encoding is performed with DES (Data Encryption Standard).

The random number generating unit 235 generates random numbers of a predetermined number of bits, and outputs the random numbers to the encoding unit 234 and the encoding unit 236 as a contents key. In the present embodiment, 56-bit random numbers are generated and output.

The encoding unit 236 encodes the contents key input from the random number generating unit 235 with an arbitrary shared key method using the distributing key supplied from the EMD service center 100, and outputs this to the secure container creating unit 238. With the present embodiment encoding is performed with DES.

The policy storing unit 237 stores the obtaining policies for the distributed contents (hereafter also referred to simply as "policy"), and outputs to the secure container creating unit 238, in a manner corresponding to the encoded contents.

Figure 5:
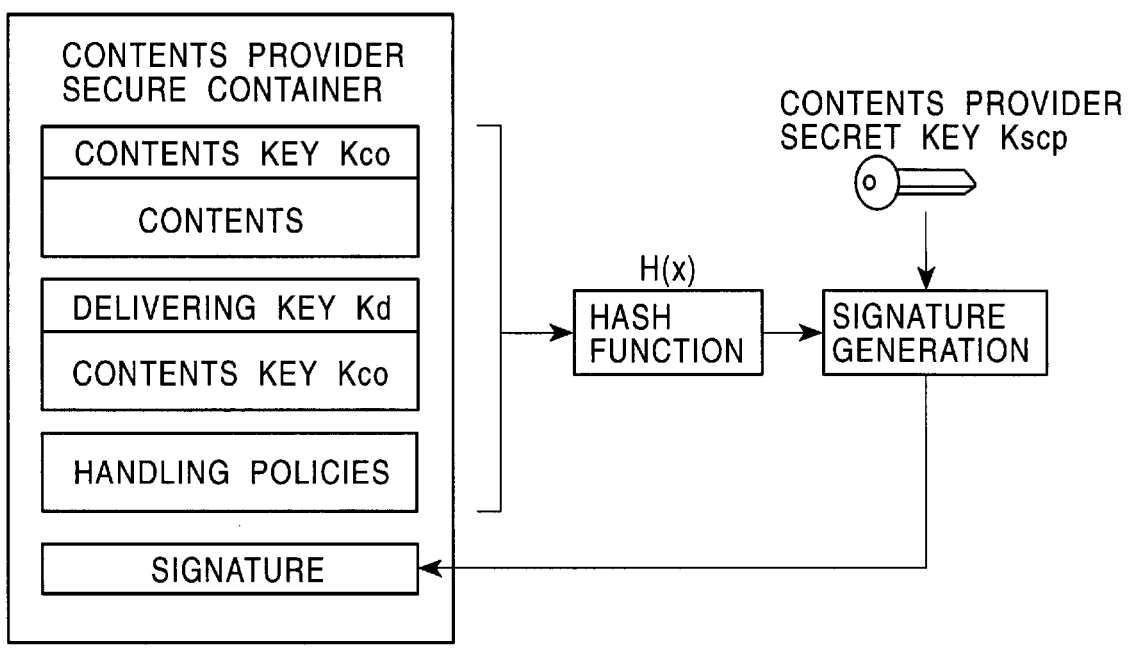
FIG. 5 is a diagram illustrating the configuration of a contents provider secure container created in the secure container creating unit of the contents provider shown in FIG. 4.
Figure 6:
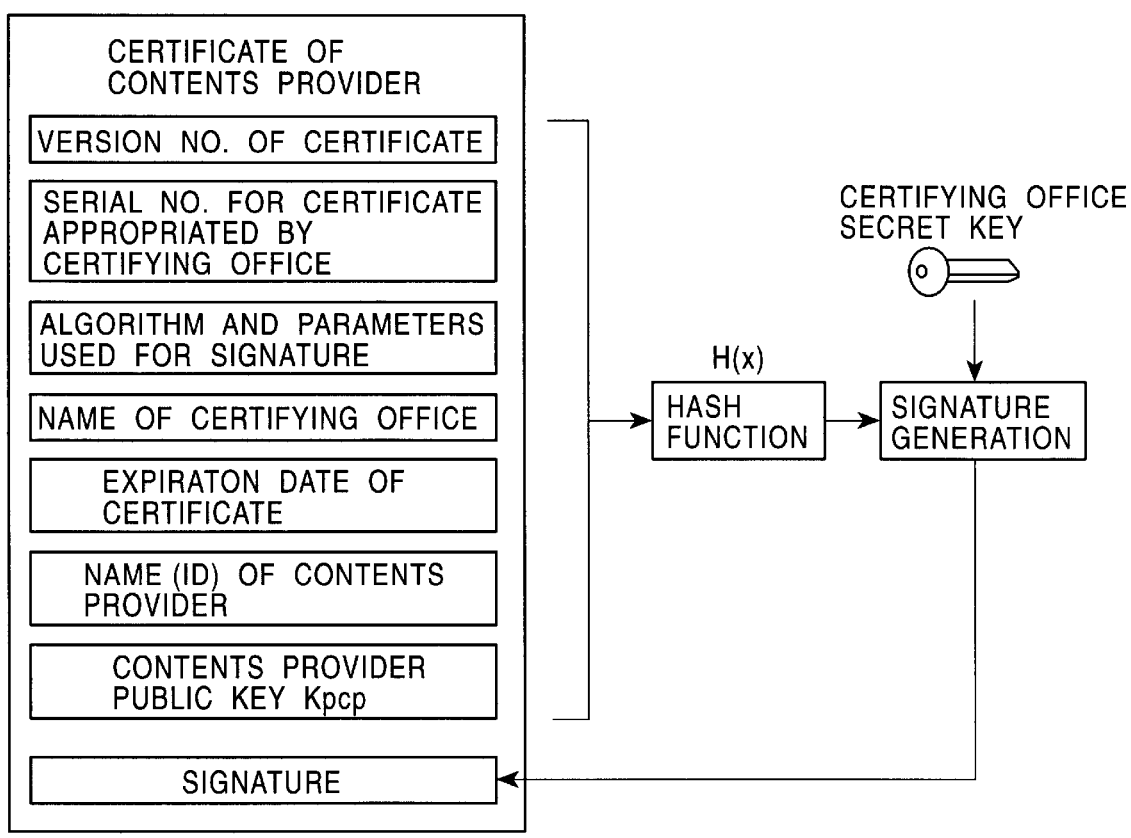
FIG. 6 is a diagram illustrating the configuration of a certificate of a contents provider attached to the contents provider secure container shown in FIG. 5.

As shown in FIG. 5, the secure container creating unit 238 creates a contents provider secure container having the contents data encoded by the contents key in the encoding unit 234, the contents key encoded by the distributed key in the encoding unit 236, the handling policy input from the policy storing unit 237, and a signature created by taking the hash value of the encoded contents data contents encoded contents key and handling policy, and further adds a certificate of the contents provider 200 as shown in FIG. 6 and provides this to the service provider 300.

The certificate of the contents provider 200 is data having the version No. of the certificate, serial No. for the certificate appropriated to the contents provider by the certifying office, algorithms and parameters used for the signature, the name of the certifying office, expiration date of the certificate, name (ID) of the contents provider 200, public key of the contents provider 200, and a signature created by taking the hash value of the data, and the configuration thereof is shown in FIG. 6.

Now the signatures used for the contents provider secure container and the certificate of the contents provider 200 is data used for attaching to data or certificates, for checking against alteration and certifying the creator. A hash value is taken with a hash function based on the data to be transmitted, and this is encoded with a secret key using a public key method. With the present embodiment, encoding is performed by RSA (Rivest-Shamir-Adleman).

Also, a hash function is a function which compresses input data to a predetermined bit length, which is output as a hash value. Hash functions have characteristics that it is difficult to predict input data from the hash value, that many bits in the hash value change according to one bit changing in the input data, and also that it is difficult to find input data having the same hash value. With the present embodiment, MD4, MD5, and SHA-1 are used as hash functions.

Accordingly, the recipient receiving the signature and data decodes the signature with the public key of the public key encryption, and obtains the hash value as the result thereof. On the other hand, the hash value of the received data is calculated, and a check is made whether or not the calculated hash value and the hash value obtained by decoding the signature are the same. In the event that these are the same, confirmation can be made that the received data has not been altered, and that the data has been transmitted from a sender holding the secret key corresponding to the public key.

The mutual verification unit 239 performs mutual verification with each of the EMD service center 100 and the service provider 300, in the event of receiving the distributing key from the EMD service center 100, and in the event of providing a contents provider secure container to the service provider 300.

This concludes description of the configuration of the contents provider 200.

The service provider 300 distributes contents supplied from the contents provider 200 to the user home network 400$_{-1}$ via an arbitrary distribution network. At this time, a distribution method provided with newly added values or the like is used, and sales prices and the like for the user home network 400$_{-1}$ are also determined.

Figure 7:
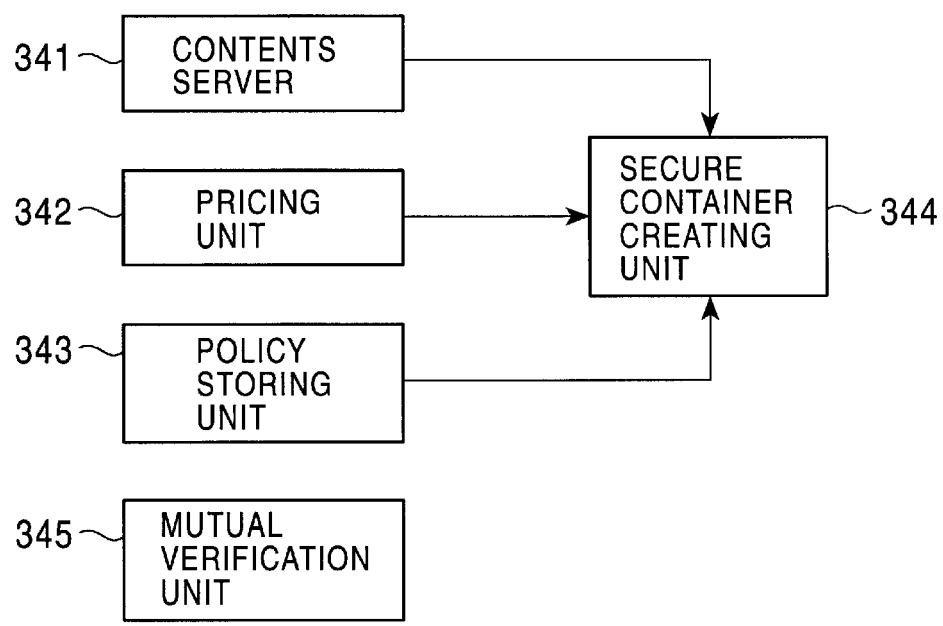
FIG. 7 is a block diagram illustrating the configuration of the service provider of the EMD system shown in FIG. 1.

The configuration of the service provider 300 will be described with reference to FIG. 7.

The service provider 300 is comprised of a contents server 341, a pricing unit 342, a policy storing unit 343, a secure container creating unit 344, and a mutual verification unit 345.

The contents server 341 stores the encoded contents transmitted from the contents provider 200, and supplies this to the secure container creating unit 344.

The pricing unit 342 creates pricing information based on the handling policy corresponding to the contents, and supplies this to the secure container creating unit 344.

The policy storing unit 343 stores the handling policy of the contents supplied from the contents provider 200, and supplies this to the secure container creating unit 344.

Figure 8:
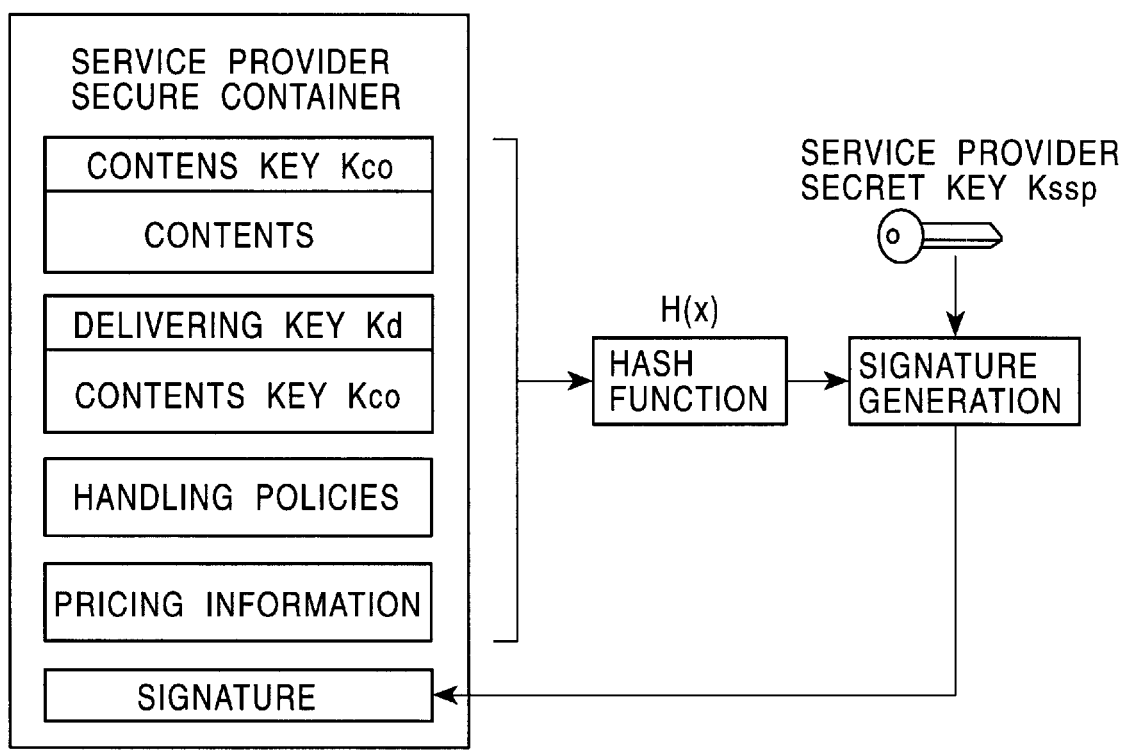
FIG. 8 is a diagram illustrating the configuration of a service provider secure container created in the secure container creating unit of the service provider shown in FIG. 7.
Figure 9:
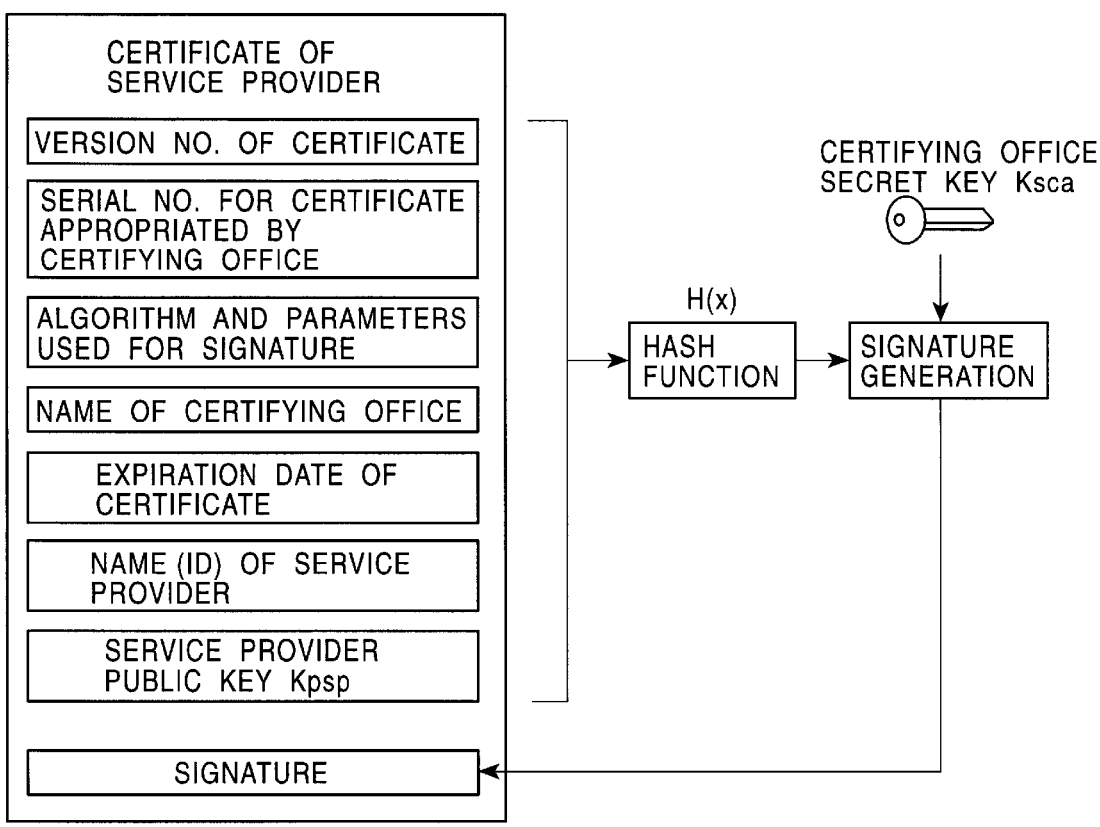
FIG. 9 is a diagram illustrating the configuration of a certificate of a service provider attached to the service provider secure container shown in FIG. 8.

As shown in FIG. 8, the secure container creating unit 344 creates a service provider secure container having the contents data encoded by the contents key provided from the contents server 341, the contents key encoded by the distributed key, pricing information provided from the pricing unit 342, the handling policy input from the policy storing unit 343, and a signature created by taking the hash value of the encoded contents data, encoded contents key, and handling policy, and further adds a certificate of the service provider 300 as shown in FIG. 9 and provides this to the user home network 400$_{-1}$.

As shown in FIG. 9, the configuration of the certificate of the service provider 300 is data which has the version No. of the certificate, serial No. for the certificate appropriated to the service provider 300 by the certifying office, algorithms and parameters used for the signature, the name of the certifying office, expiration date of the certificate, name of the service provider 300, public key of the service provider 300, and a signature created by taking the hash value of the data.

The mutual verification unit 345 performs mutual verification processing with each of the contents provider 200 and the user home network 400$_{-1}$, at the time of receiving contents provider secure containers from the contents provider 200 and transmitting service provider secure containers to the user home network 400$_{-1}$.

This concludes description of the configuration of the service provider 300.

The user home networks 400$_{-1}$ and 400$_{-2}$ obtain the contents distributed from the service provider 300, use the key provided from the EMD service center 100 to decipher, decode and use the contents, and pay the EMD service center 100 charges corresponding to the usage.

The configuration of the user home networks 400$_{-1}$ and 400$_{-2}$ will be described with reference to FIG. 10.

The user home networks 400$_{-1}$ and 400$_{-2}$ have a receiver 451, hard disk drive (HDD) 452, and a recorder 453.

The receiver 451 receives service provider secure containers from the service provider 300, and performs decoding and expanding of the contents, which are played.

The receiver 451 comprises a communication unit 461, a SAM (Secure Application Module) 462, and an expanding unit 463.

The communication unit 461 performs communication with the service provider 300 or EMD service center 100 via the network, to carry out receiving of service provider secure containers from the service provider 300, transmitting of use information and billing information to the EMD service center 100, and so forth.

The SAM 462 performs communication with the service provider 300 or EMD service center 100 via the communication unit 461, and based on the distributed key distributed from the EMD service center 100, performs control of decoding and encoding of contents, manages usage states of the contents, performs billing processing, and so forth.

This SAM 462 is configured of a single-chip encoded-processing-dedicated IC, so as to make external unauthorized data reading difficult (i.e., to facilitate tamper-proofing).

The SAM 462 comprises a mutual verification module 471, a billing processing module 472, a storing module 473, and a decoding/encoding module 474.

The mutual verification module 471 performs mutual verification between the EMD service center 100 and the service provider 300, so that communication between the EMD service center 100 and the service provider 300 can be performed appropriately via the communication unit 461.

Also, mutual verification module 471 performs mutual verification with the expanding unit 463 as well, so that transfer of received data can be performed appropriately. At this time, if necessary a session key is generated and supplied to the decoding/encoding module 474.

The billing processing module 472 generates conditions of use information and billing information, based on the handling policy and pricing information contained in the service provider secure container received from the service provider 300, and outputs this to the storing module 473 or the encoding unit 493 of the hard disk drive 452.

The storing module 473 stores conditions of permission of use information and billing information input from the billing processing module 472, distributed keys distributed from the EMD service center 100, saving keys input from the random number generating unit 492 of the decoding/encoding module 474, and other like data, and provides this data at the time that other components perform predetermined processing.

The decoding/encoding module 474 has a decoding unit 491, random number generating unit 492, and an encoding unit 493.

The decoding unit 491 decodes the encoded contents key contained in the received service provider secure container, with the distributed key distributed beforehand and stored in the storing module 473, and outputs this to the encoding unit 493.

The random number generating unit 492 generates random numbers of a predetermined number of digits, and outputs this as a saving key to the encoding unit 493 and the storing module 473.

The encoding unit 493 once more encodes the input contents key decoded by the decoding unit 491 using the saving key, and outputs this to the hard disk drive 452. Also, at the time of sending the decoded contents key to the expanding unit 463, the encoding unit 493 encodes the decoded contents key using the session key provided from the mutual verification module 471, and outputs this to the expanding unit 463.

The expanding unit 463 decodes and expands the encoded contents, affixes a predetermined electronic watermark thereto, and plays and outputs this.

The expanding unit 463 comprises a mutual verification module 475, a first decoding module 476, a second decoding module 477, a expanding module 478, and a watermark adding module 479.

The mutual verification module 475 performs mutual verification with the SAM 462, obtains a session key, and outputs to the first decoding module 476.

The first decoding module 476 decodes the contents key which is read out from the storing module 473, encoded with the session key at the encoding unit 493 of the decoding/encoding module 474, and input, with the session key input from the mutual verification module 475, and outputs to the second decoding module 477.

The second decoding module 477 decodes the contents recorded on the hard disk drive 452 with the contents key input from the first decoding module 476, and outputs to the expanding module 478.

The expanding module 478 expands the decoded contents with a method such as ATRAC2 for example, and outputs to the watermark adding module 479.

The watermark adding module 479 superimposes a predetermined electronic watermark for specifying the receiver 451, to the decoded contents, and outputs this to the recorder 453 plays and outputs from an unshown speaker.

The hard disk drive 452 records the coded contents data of the service provider secure container received from the service provider 300.

The recorder 453 records the contents received from the service provider 300 onto a mounted optical disk, and also plays the contents recorded on the optical disk.

The recorder 453 comprises a recording/playing unit 465, a SAM 466, and an expanding unit 467.

An optical disk is mounted to the recording/playing unit 465, for recording and playing contents thereupon.

The SAM 466 records onto the optical disk via the recording/playing unit 465, or performs control of decoding and encoding, management of the use state of contents, billing processing, etc., regarding the contents played from the optical disk. The configuration of this SAM 466 is the same as the configuration of the above-described SAM 462.

The expanding unit 467 decodes, expands, affixes with a predetermined electronic watermark, and plays and outputs, the contents supplied by the SAM 466, and read out from the optical disk via the recording/playing unit 465 in particular. The configuration of this expanding unit 467 is the same as that of the above-described expanding unit 463.

This concludes description of the configuration of the user home networks 400$_{-1}$ and 400$_{-2}$.

Figure 11:
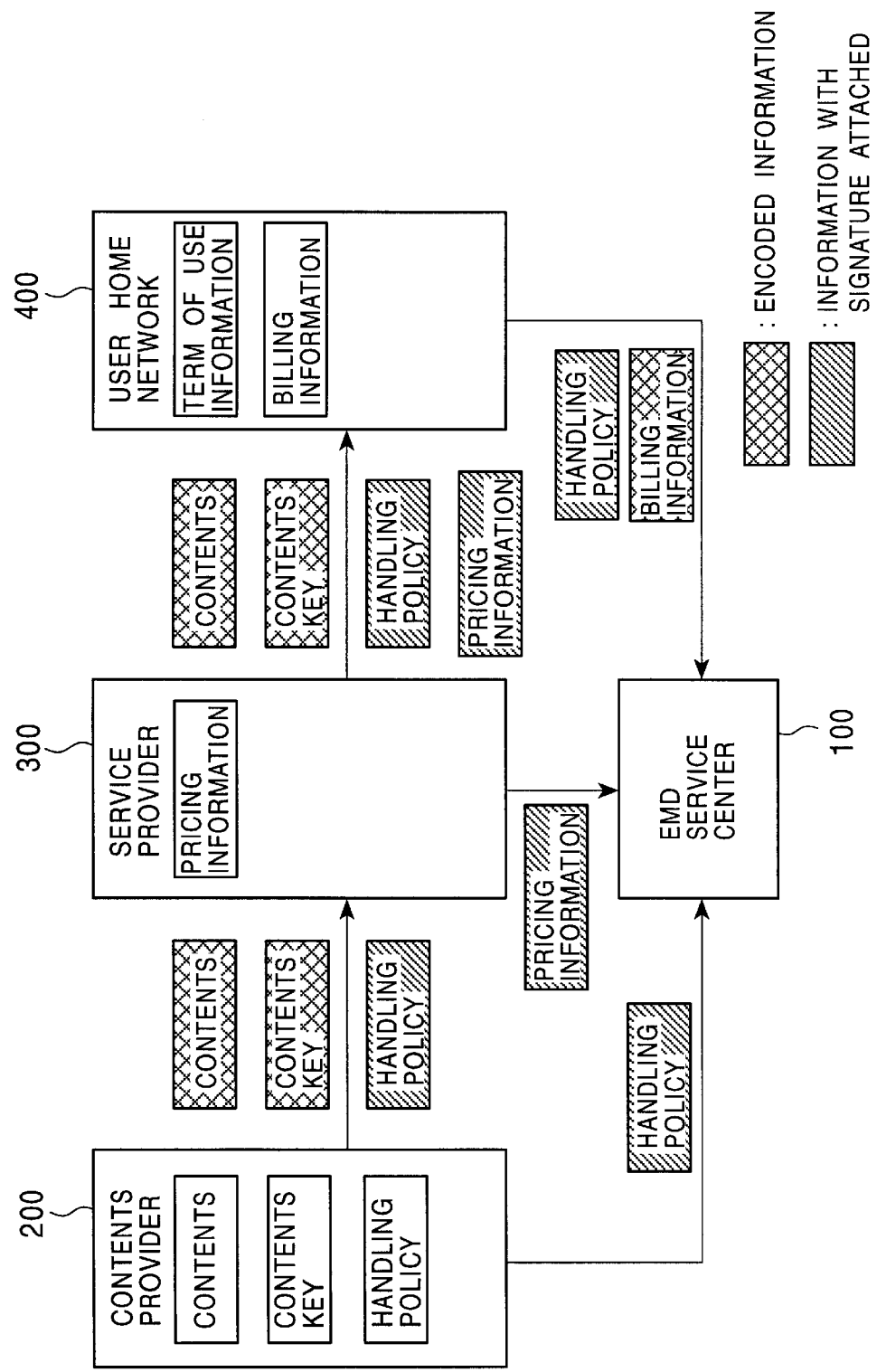
FIG. 11 is a diagram for describing the flow of information and the flow of processing music distribution, in the EMD system shown in FIG. 1.

Next, description will be made regarding the flow of information and the flow of processing music distribution in the EMD system 1 configured thus, with reference to FIG. 11.

In the following description, only one user home network 400 will be shown for the user home networks, in order to facilitate ease of description.

First, the contents provider 200 stores the encoded contents, encoded contents key, handling policy, and signature in the contents provider secure container, and further attaches the certificate of the contents provider, and transmits this to the service provider 300.

On the other hand, the contents provider 200 attaches the certificate of the contents provider 200 to the handling policy and signature, and transmits this to the EMD service center 100.

The service provider 300 generates pricing information based on the handling policy contained in the contents provider secure container, stores the encoded contents, encoded contents key, handing policy, pricing information and signature in the service provider secure container, and further attaches the certificate of the service provider, and transmits this to the user home network 400.

On the other hand, the service provider 300 attaches the certificate of the service provider 300 to the pricing information and signature, and transmits this to the EMD service center 100.

The user home network 400 generates permission of use information from the handling policy contained in the received service provider secure container, and uses the contents according to the permission of use information. In the event that the contents key is decoded in the user home network 400, billing information is generated. The generated billing information is encoded at a predetermined timing, a signature is affixed along with the handling policy, and this is transmitted to the EMD service center 100.

The EMD service center 100 calculates the usage charges based on the billing information and handling policy transmitted from the user home network 400, and calculates the profit distribution and distribution amount for the EMD service center 100, contents provider 200, and service provider 300. Then, the EMD service center 100 issues instructions to an unshown settlement firm so that settlement is actually carried out, based on these calculation results.

Also, the EMD service center 100 compares the handling policy received from the contents provider 200, the pricing information received from the service provider 300, and the billing information and handling policy obtained from the user home network 400, and inspects whether or not there has been any unauthorized tampering such as altering the handling policy or adding unauthorized prices, at the service provider 300 or user home network 400.

Now, the method according to the present invention by which music copyright material is distributed while performing appropriate copy controlling to both serial generations and parallel generations with the EMD system 1 configured thus, will be described.

The copy control relating to the present invention is not only effective regarding sales of music data from the service provider 300 to the user home networks 400$_{-1}$ and 400$_{-2}$ in the above-described EMD system, of course, but also is effective regarding easy data copying on the user level, such as individual users making further copies of the music data, for example. Accordingly, the copy control according to the present invention will be described by making description of the flow of music data following sales of music data from the service provider 300 to the user home networks 400$_{-1}$ and 400$_{-2}$.

First, the configuration of the user home networks 400$_{-1}$ and 400$_{-2}$ used in the description of such a music data copying method will be described with reference to FIG. 12.

A typical configuration of the user home networks $400_{-1}$ and $400_{-2}$ has been described with reference to FIG. 10, but in reality, the user home networks are configured of data recording devices, playing devices, recording/playing devices, and other various types of devices, both in the home and out of the home, in various forms.

Figure 12:
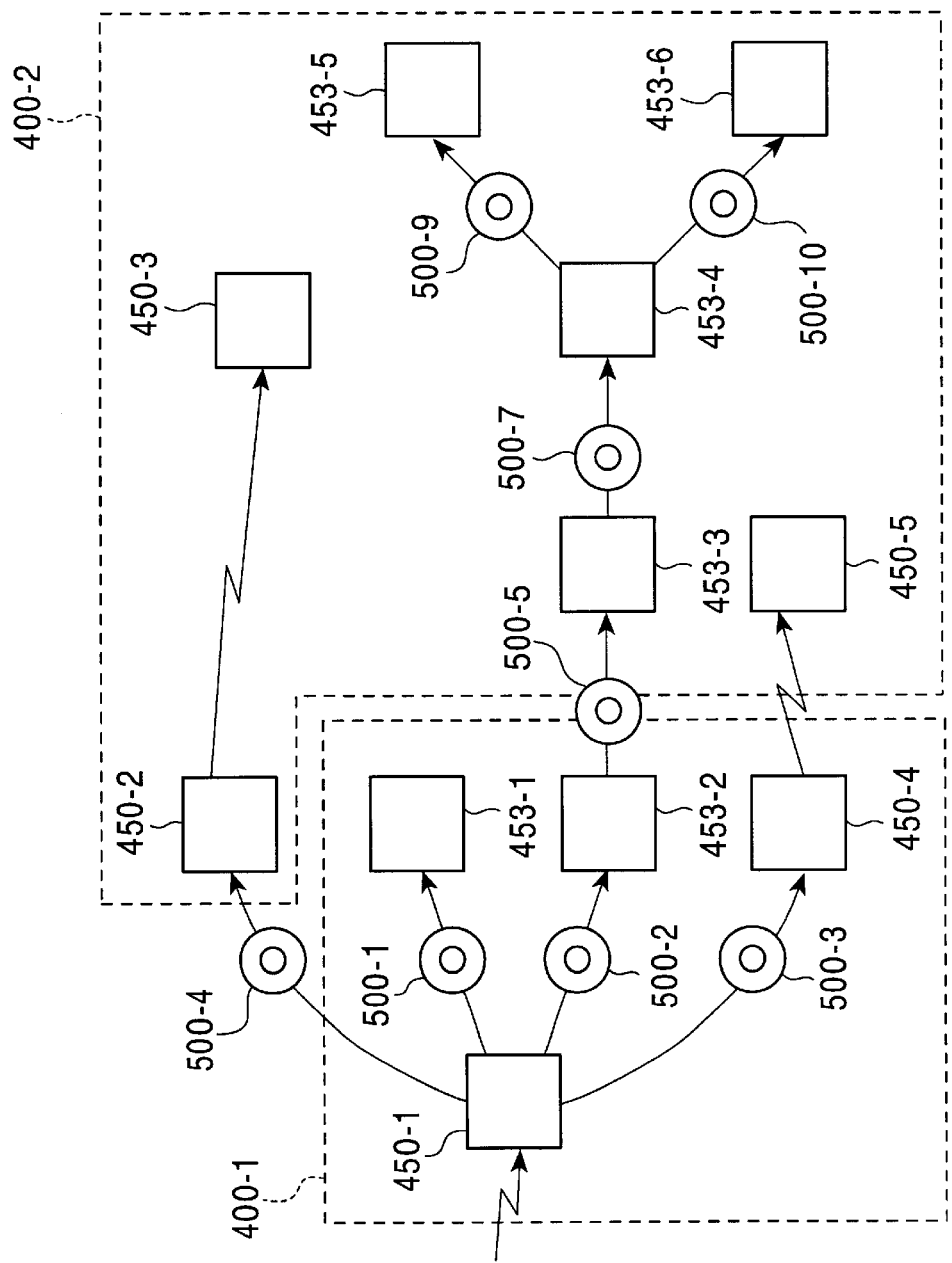
FIG. 12 is a diagram illustrating the configuration of a user home network suitable for describing the copy control of data, relating to the present invention.

FIG. 12 is a diagram illustrating an example thereof.

Figure 10:
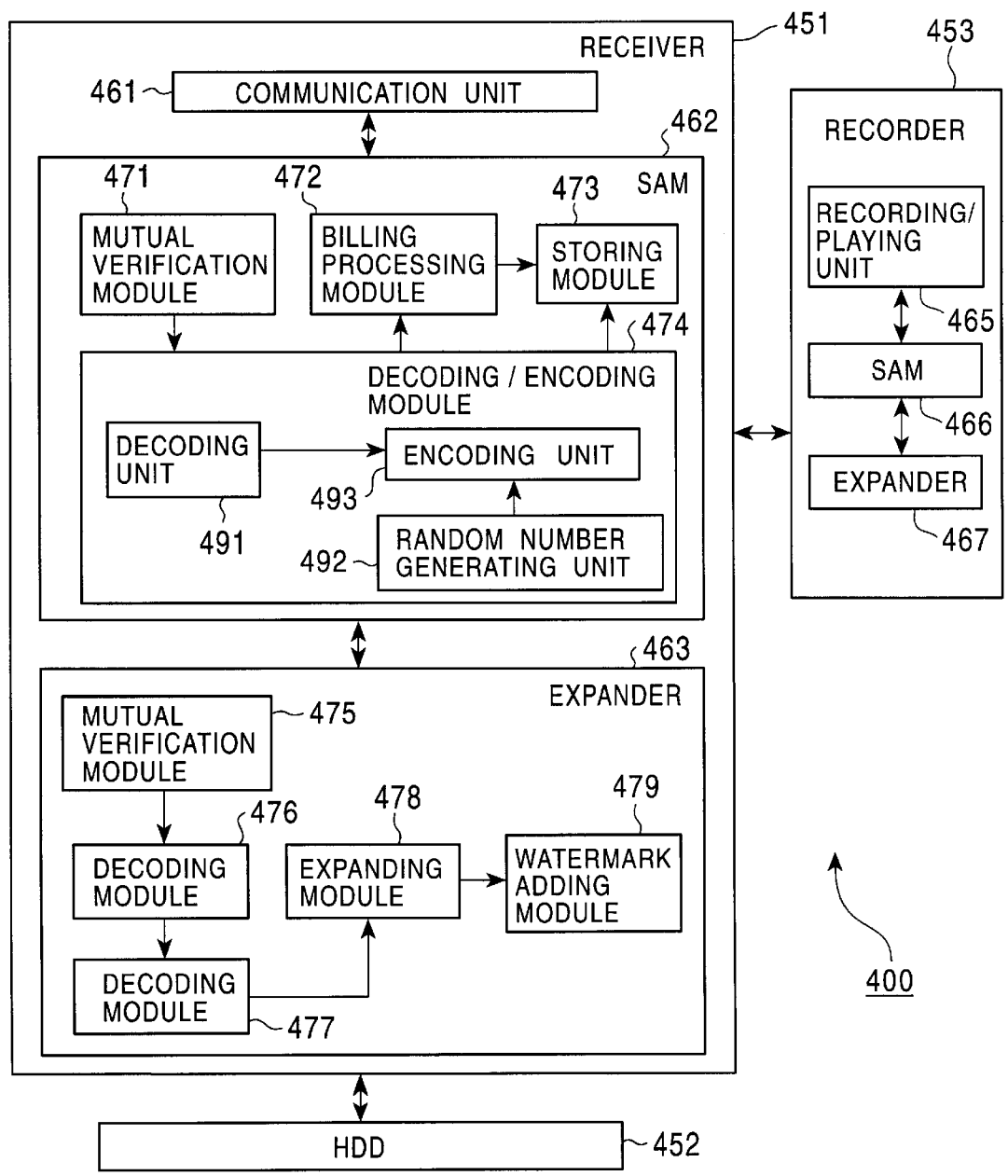
FIG. 10 is a block diagram illustrating the configuration of a user home network of the EMD system shown in FIG. 1.

Here, let us say that there is a user home network 400 which is equivalent to the user home network 400 shown in FIG. 10, made up of a communication recording/playing device 450 comprising a receiver 451, hard disk device 452, and recorder 453, and a normal recorder 453 essentially configured of a recorder 453 alone.

Music data is provided to the communication recording/playing device 450 via the network or via the optical disk 500, and to the recorder 453 via the optical disk 500, and also supplied to other devices therefrom.

Now, the two user home networks, i.e., the first user home network $400_{-1}$ and the second user home network $400_{-2}$, are user home networks configured in different homes for example, and represent user home networks having communication recording/playing devices 450 capable of communication with at least one EMD service center 100 and service provider 300, as one user home network.

Now, the communication recording/playing device $450_{-1}$ of such a user home network $400_{-2}$ receives music data from the service provider 300, based on a request from the user, or based on predetermined certain timing and rules, for example. In this case, the communication recording/playing device 450 receives the music data in the format of the service provider secure container of the format shown in FIG. 8.

This service provider secure container contains the handling policy and pricing information as conditions for the contents provider 200 to distribute the music data.

Specifically, this handling policy lists information such as the number of permitted times of playing the music data, the number of times of recording (copying), billing methods permitted, and so forth. Also, the pricing information lists information such as prices charged each time recording or playing is performed, the price for completely purchasing, and so forth.

At the communication recording/playing device $450_{-1}$, at the time of receiving such a service provider secure container, only verification of whether the data is data transmitted from an authorized service provider 300 or not is made, and not particular processing is performed on the contents data, with the service provider secure container being stored in the hard disk drive 452 as is. In the event that the user decides to play or record, i.e., use the music data contained in this service provider secure container, and performs operations to this end, the billing processing module 472 of the SAM 462 of the receiver 451 reads out the handling policy, determines the usage format within the range permitted by the handing policy, based on the selections and settings made by the user, extracts the pricing system by making reference to the pricing information, and generates information of conditions of use (policy) describing the use formats and priding system. Also, usage state (status) information is also generated for managing the usage state.

Then, subsequent use of the contents data within the user home network $400_{-1}$ is managed, based on these sets of information, i.e., the conditions of use and the usage state.

Figure 13:
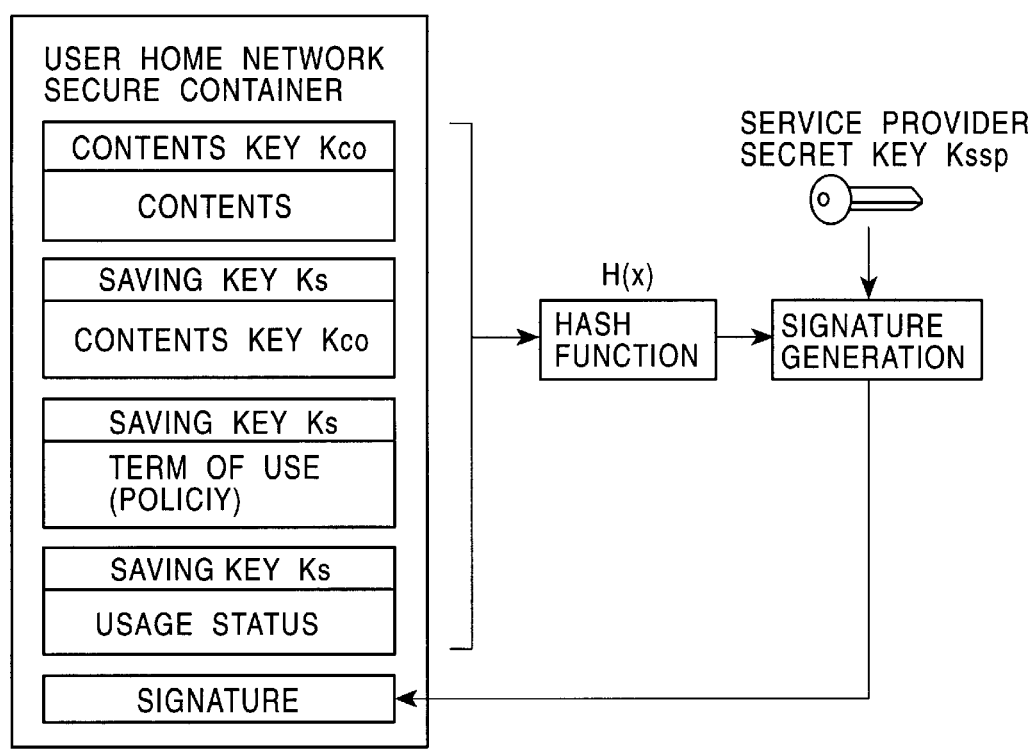
FIG. 13 is a diagram illustrating the configuration of a user home network secure container created by the receiver shown in FIG. 10.

Detailed description of the actual management method will be described later, but in the event for example of the copying the contents data to optical disks $500_{-1}$ through $500_{-4}$ and playing on other recorders $453_{-1}$, $453_{-2}$, $453_{-4}$, and the communication recording/playing device $450_{-2}$, copying is performed in the format of a user home network secure container containing the information of the conditions of use and the usage state, as shown in FIG. 13.

Now, description will be made regarding the format described in the handling policy of the above-described secure containers, which is a billing format for distributing music data with the EMD system 1. Various types of formats may be conceived for the billing format regarding the distributed music data, but description will be given here regarding the recording billing (pay-per-copy) method, the playing billing (pay-per-use) method, and the purchasing method.

Figure 14:
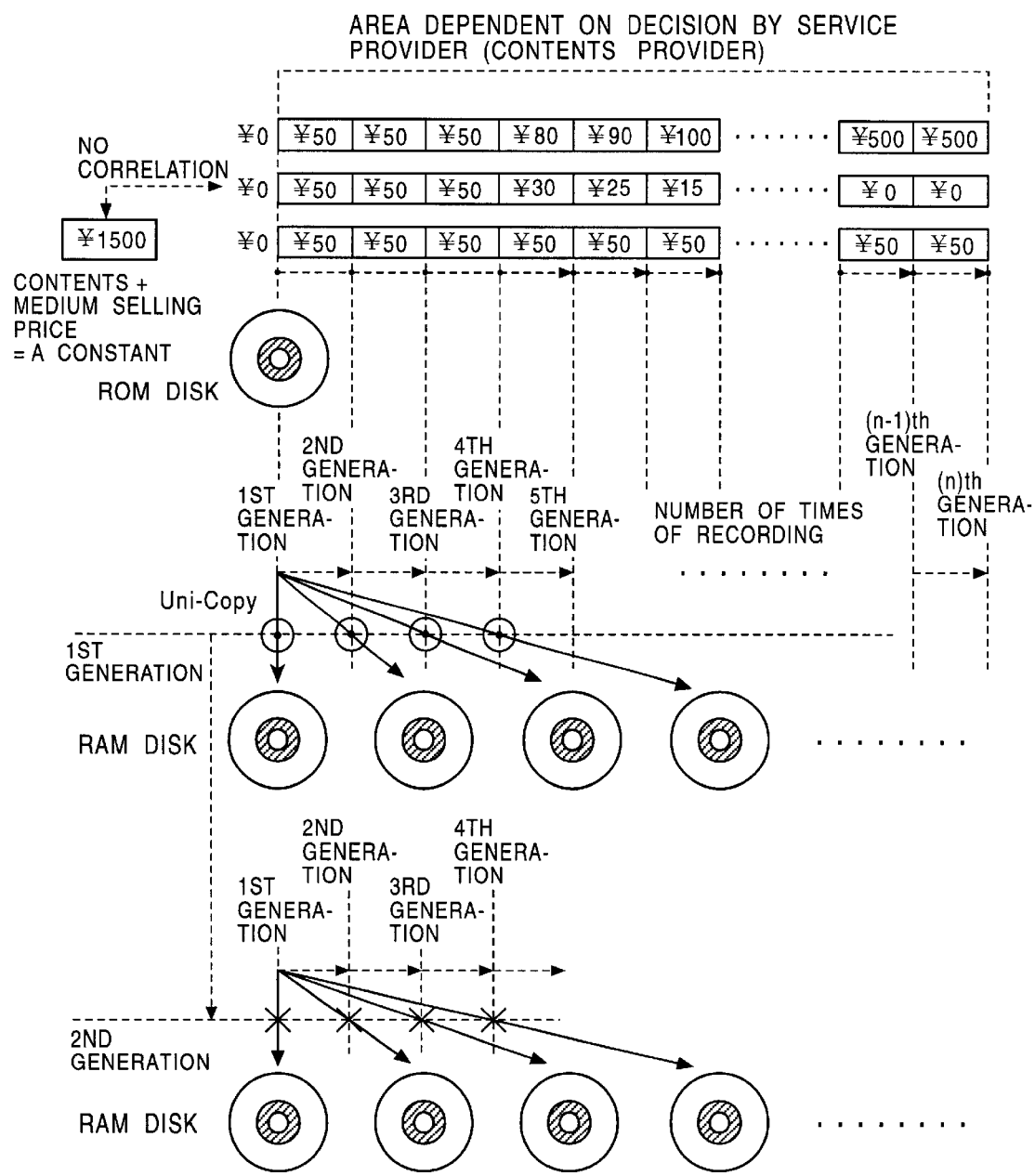
FIG. 14 is a diagram for describing billing formats of recording billing methods in the EMD system shown in FIG. 1.

FIG. 14 is a diagram illustrating the concept of the billing format of the recording billing method.

The recording billing method is a method wherein the user is charged for each copy made. That is to say, the user purchases the right to copy one musical piece unit of contents to a recording media, by paying a compensation to the copyright holder (the contents provider 200).

The amount of money required for one copy may be set so as to be an equal price however many copies are made, or set to decrease each time the number of copies increase, to service the customer. Also, an inverse arrangement may be taken to restrict the number of copies made. In any case, this is determined by the contents provider 200 or the service provider 300.

A concept wherein a flag equivalent of the right to make one copy is made into a recording ticket (copy ticket), or wherein the side for copying sells the contents thereof, shall be referred to as copyright.

For example, the communication recording/playing device 450 or recorder 453 within the user home network 400 which is the side for copying purchases recording tickets (copy tickets) in units of contents from the EMD service center 100 before copying to the optical disk 500, and pays the copyright holder a corresponding compensation via the network or offline.

Now, the concept of recording tickets, and processing related thereto, will be described in detail later.

Figure 15:
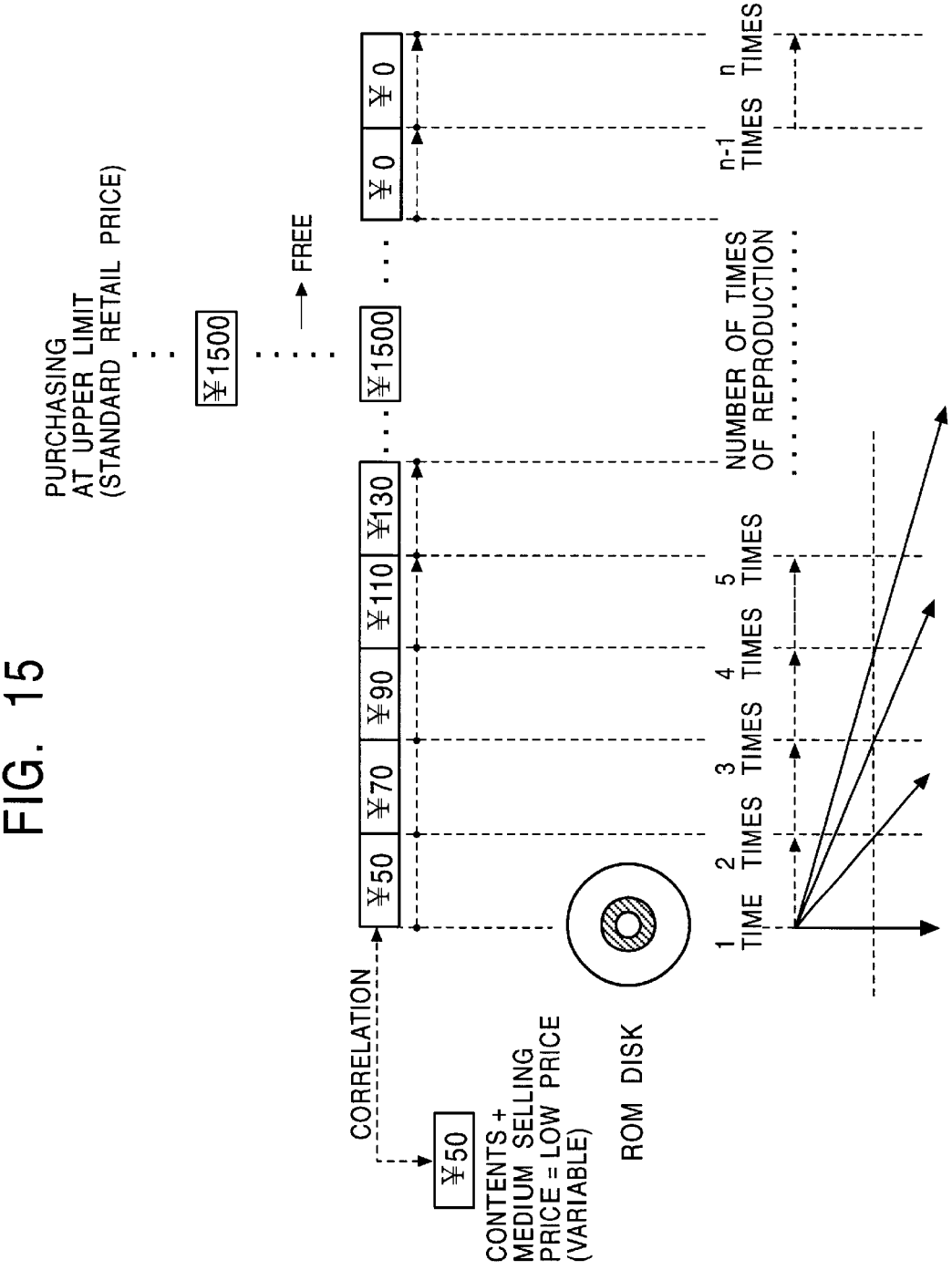
FIG. 15 is a diagram for describing billing formats of playing billing methods in the EMD system shown in FIG. 1.

FIG. 15 is a diagram illustrating the concept of the billing format of the playing billing method.

The playing billing method is a method wherein an equivalent amount is paid each time the data is played. With this method, the contents and recording media is initially obtained for free or at a low cost, and then the listener pays according to however much he/she has listened, and thus is an extremely logical payment format from the perspective of the user. However, in the event that there is no upper limit set, there is the possibility that the user may continue paying indefinitely, so an upper value is preferably set as a sales price. At the point that the user reaches the number of times of listening wherein the charges thereof are the same as the sales price, the user has the same rights as having purchased the contents, and subsequent playing is without charge. The billing amounts for this playing is also determined by the contents provider 200 or the service provider 300.

With the purchasing method, the user buys the contents with an amount of money equivalent to the contents from the beginning. This is a format close to the way in which contents are currently being sold. However, there is no need to permit unconditional and unlimited use of the contents, and an arrangement may be made wherein the maximum number of times of use, maximum number of times of playing, maximum number of copies, etc., may be restricted by being listed in the handling policies.

This purchasing amount is also determined by the contents provider 200 or the service provider 300, but depending on the sales policy regarding the purchasing method, an arbitrary price may be set. For example, in the event that the upper limit of the sales price of the playing billing method is set higher than the sales price of the buying method, users will select both the playing billing method and the buying method at a certain ratio, but in the event that the sales price of the buying method is equal to or higher than the upper limit price of the playing billing method, it is thought that users will almost always select the playing billing method. Thus the billing format can be controlled by setting the pricing information, and the contents provider 200 or the service provider 300 may determine the pricing information from such a perspective.

Now, description will be made regarding the configuration of such an EMD system 1, the flow of data, and the processing according to the present invention for controlling the use thereof while also controlling the number of times of playing and recording in both the serial direction and the parallel direction, based on such a billing format.

Note that the processing using recording tickets, which will be described in detail later, is applicable to arbitrary billing formats, but can be applied most directly to the case of recording billing, so from here on, detailed description will be made with the aforementioned case of recording billing as a specific example.

First, here, description of recording tickets (copy tickets) for simultaneously managing both the serial generations and parallel generations will be made, in order to facilitate ease of description.

First, the concept of times-counting type recording tickets (copy tickets) for managing both serial generations and parallel generations will be described with reference to FIG. 16.

Figure 16:
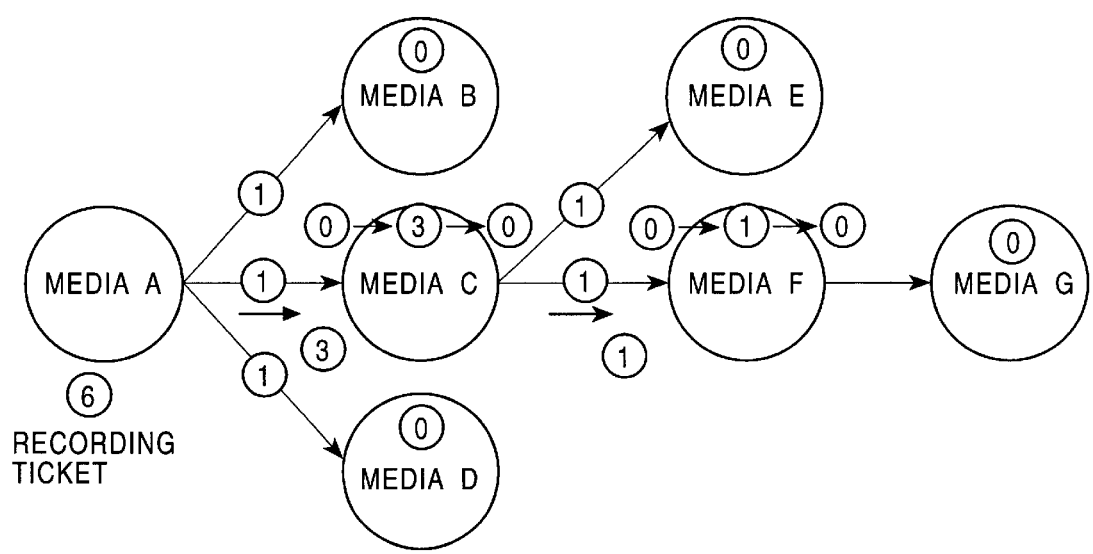
FIG. 16 is a diagram for describing the concept of recording tickets (copy tickets) according to the present invention, which simultaneously manage both serial generations and parallel generations.

FIG. 16 is a diagram for describing the concept of recording tickets (copy tickets) for simultaneously managing both serial and parallel generations.

Times-counting type recording tickets for managing both serial generations and parallel generations set a number of tickets containing the number of permitted copies of both the serial generations and parallel generations. That is, within the number of purchased tickets, how many generations in the serial generation direction and how many generations in the parallel generation direction this will be used for is altogether left for the user to decide.

Specifically, with this method, based on the rules shown in Expression (1), the playing and recording of the contents are controlled.

Expression (1)

(Parallel generation copies)=(Recording ticket count)+(Playing output)

(Serial generation copies)=(Recording ticket count)+(Number of recording tickets handed over)

First, the number of parallel generations are confirmed, the corresponding number of tickets are counted, and permission of playing output is given.

Next, the number of serial generations is confirmed, and the corresponding number of recording tickets are handed over to the object medial. The media receiving these is free to use the tickets as many serial generations or how ever many parallel generations as desired. Then following copying with the medium making the copies, the recording tickets are basically zero. The media to which the tickets are handed over to is incremented by the number handed over.

In the example shown in FIG. 16, first, let us say that media A connects to the EMD service center, and obtains six recording tickets (copy tickets) beforehand.

Next, the user desires to copy three generations to the parallel generations (media B/C/D), so three of the recording tickets held are counted. After copying, the media B/C/D each have zero tickets, and the media A has three tickets.

Next, the user desires to copy in the serial generation direction of the media C, so the three recording tickets are handed over to the media C. Consequently, the media C has three copy tickets, and the media A has used all of the tickets and has zero.

The media C is free to use the three tickets however desired.

Now, in the event that the user desires to copy two generations to the parallel generations (media E/F), two of the recording tickets held are counted, and the contents are copied to the media E and F. At the same time, the user desires to copy in the serial generation direction of the media F, so one recording tickets is handed over. Consequently, the media F has one copy ticket, and the media C has used all of the tickets and has zero.

Consequently, the media F can copy to media G.

The recording tickets will be described in further detail, making reference to the specific examples shown in FIGS. 17 through 20.

Figure 17:
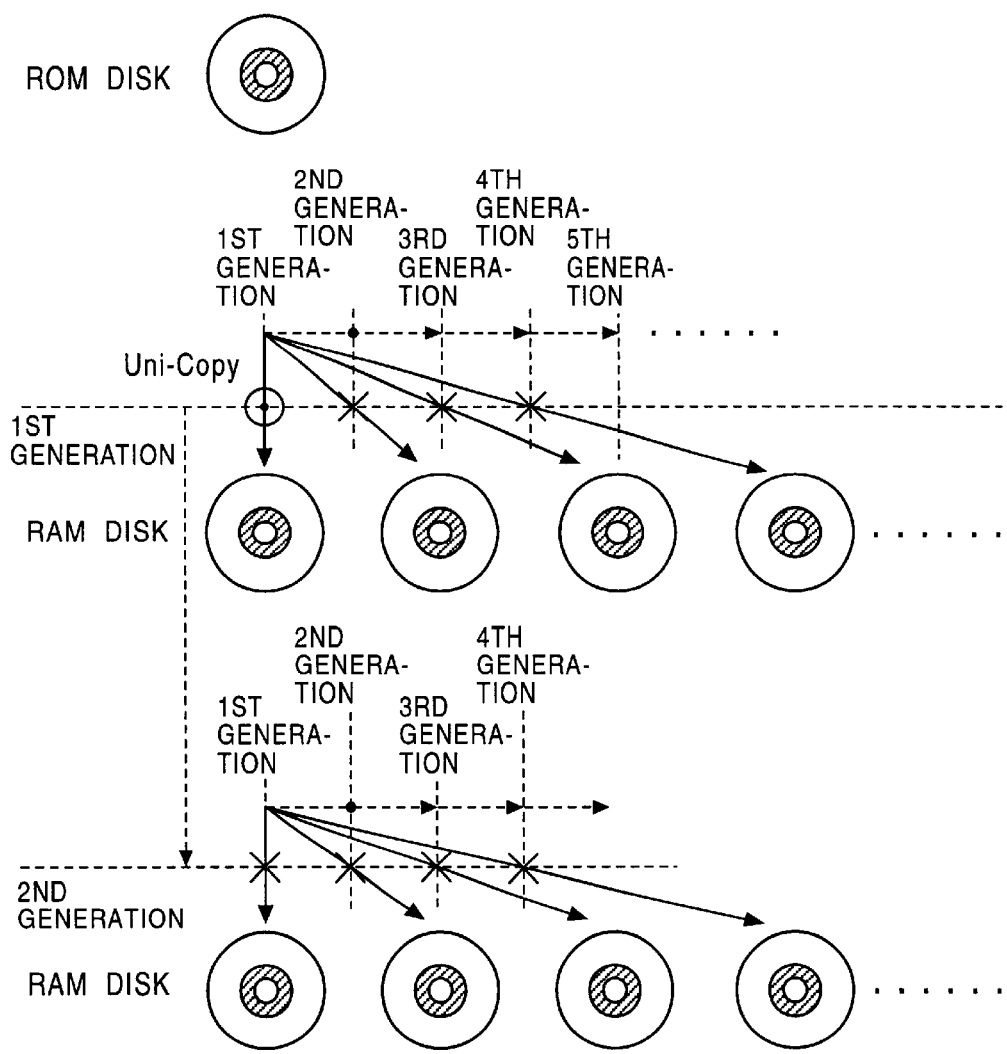
FIG. 17 is a first diagram for describing a specific usage form of the recording ticket shown in FIG. 16.

FIG. 17 is a diagram illustrating the state in the event that the number of copies permitted for parallel generations is restricted to one, in particular. In such a state, one copy can be made in whatever manner, but after that one copy, no further copies can be made, either from the original media or the newly copied medial.

Performing copy restriction in this manner can completely restrict copies being made from rented packages which were legitimately purchased. It is appropriate that the user be allowed one copy as an already-had right, for contents of purchased packaged medial.

Incidentally, such a state wherein restriction allows only one generation of parallel generation copies is referred to single-copy or uni-copy.

Figure 18:
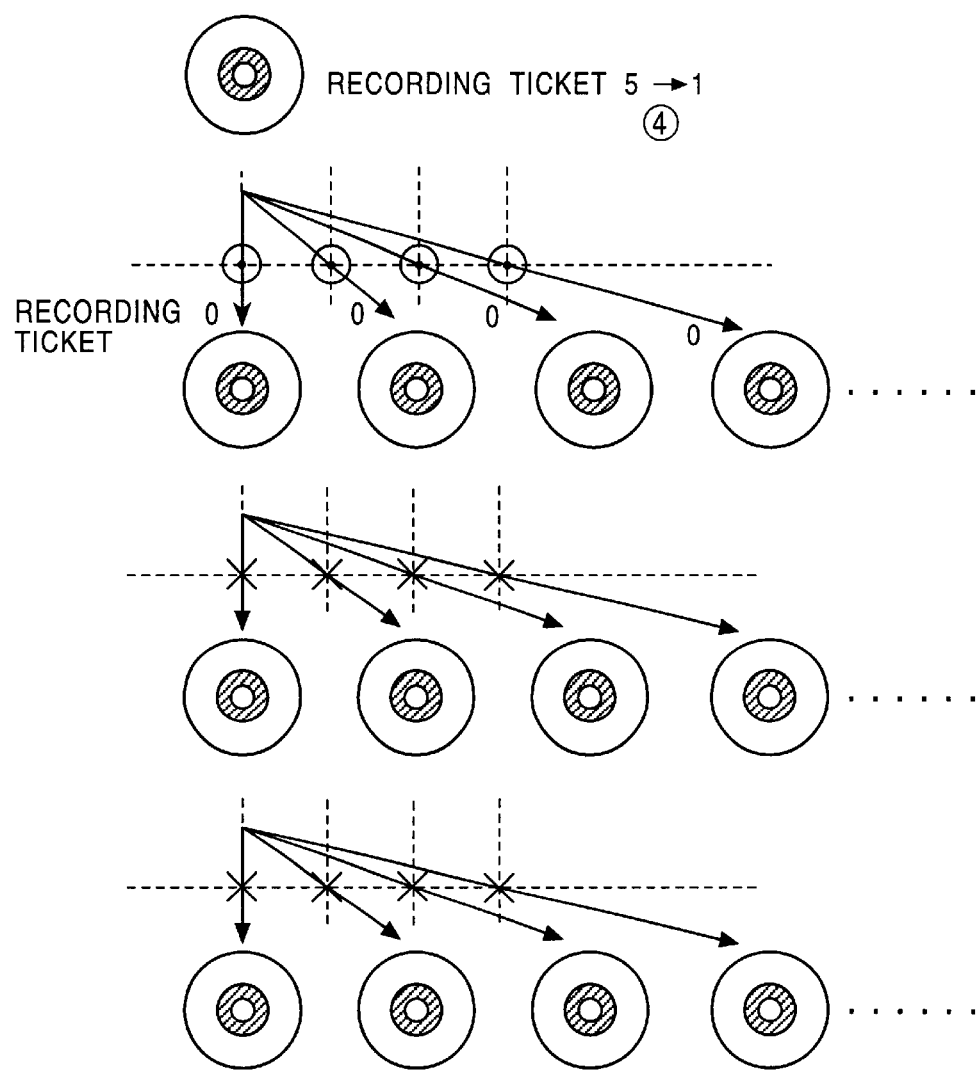
FIG. 18 is a second diagram for describing a specific usage form of the recording ticket shown in FIG. 16.

FIG. 18 illustrates a state wherein an individual purchasing the packaged media or an individual who has downloaded contents via the network and recorded the contents onto a recording media, has purchased five recording tickets (copy tickets) at the same time as purchasing or downloading contents.

Here, four copies are made in the parallel generation direction, so a total of four tickets are consumed corresponding one generation each in the parallel generations, resulting on one remaining ticket.

Figure 19:
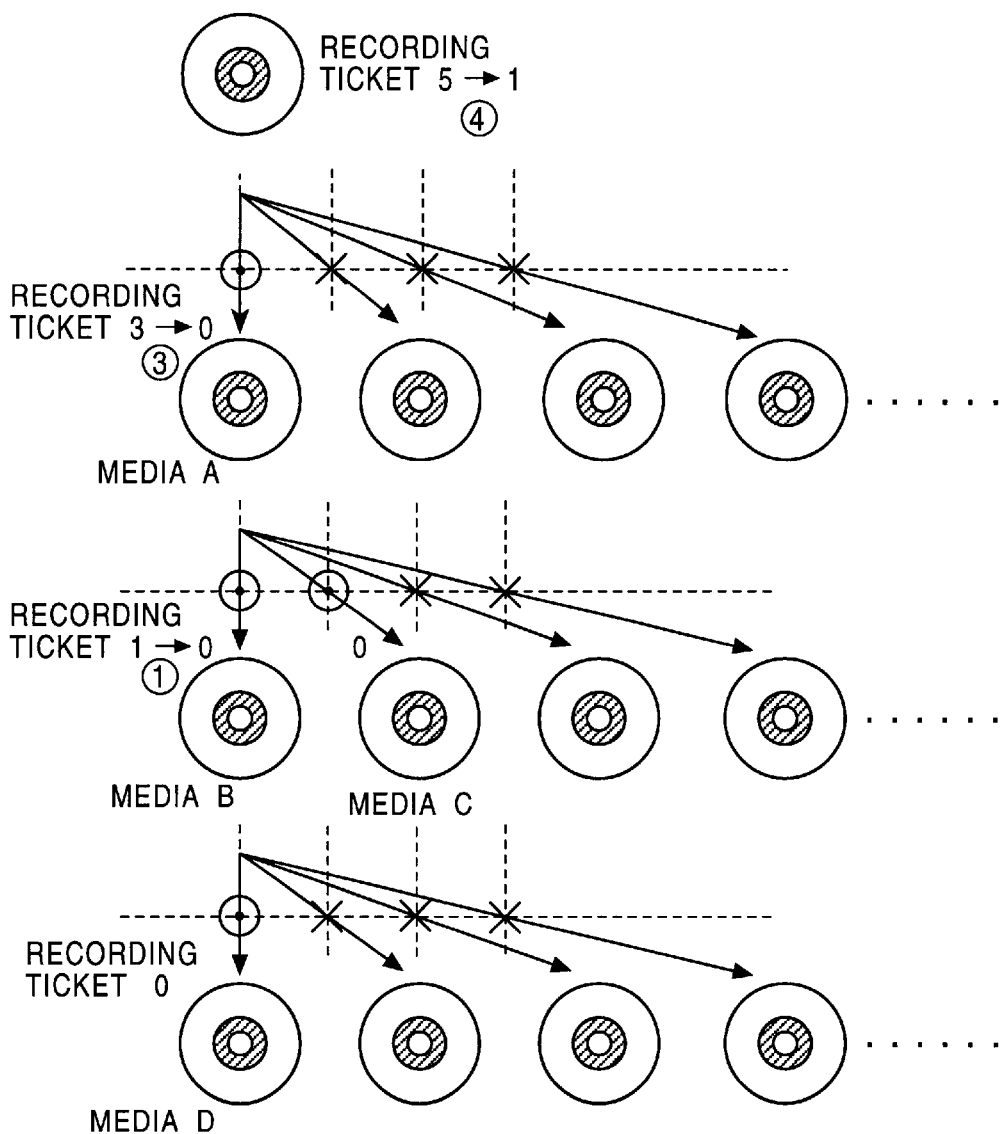
FIG. 19 is a third diagram for describing a specific usage form of the recording ticket shown in FIG. 16.

In FIG. 19, first, five recording tickets are purchased in the same manner as with FIG. 18, following which one recording ticket is used to copy to media A, and next three tickets are handed over to media A. Consequently, media A has these three tickets. The user can decide however to use these three tickets of the media A, e.g., how many generations to copy in the serial generation direction and how many in the parallel generation direction. The original media which allowed the copy has consumed four recording tickets and holds one, which means that it has the right to make one more copy.

In the example shown in FIG. 19, two of the recording tickets of media A are used to make two parallel generation copies to media B and media C, and the remaining one ticket is further handed over to media B. Consequently, media B holds one recording ticket, and uses this one to make one generation copy to the media D in the serial direction.

Figure 20:
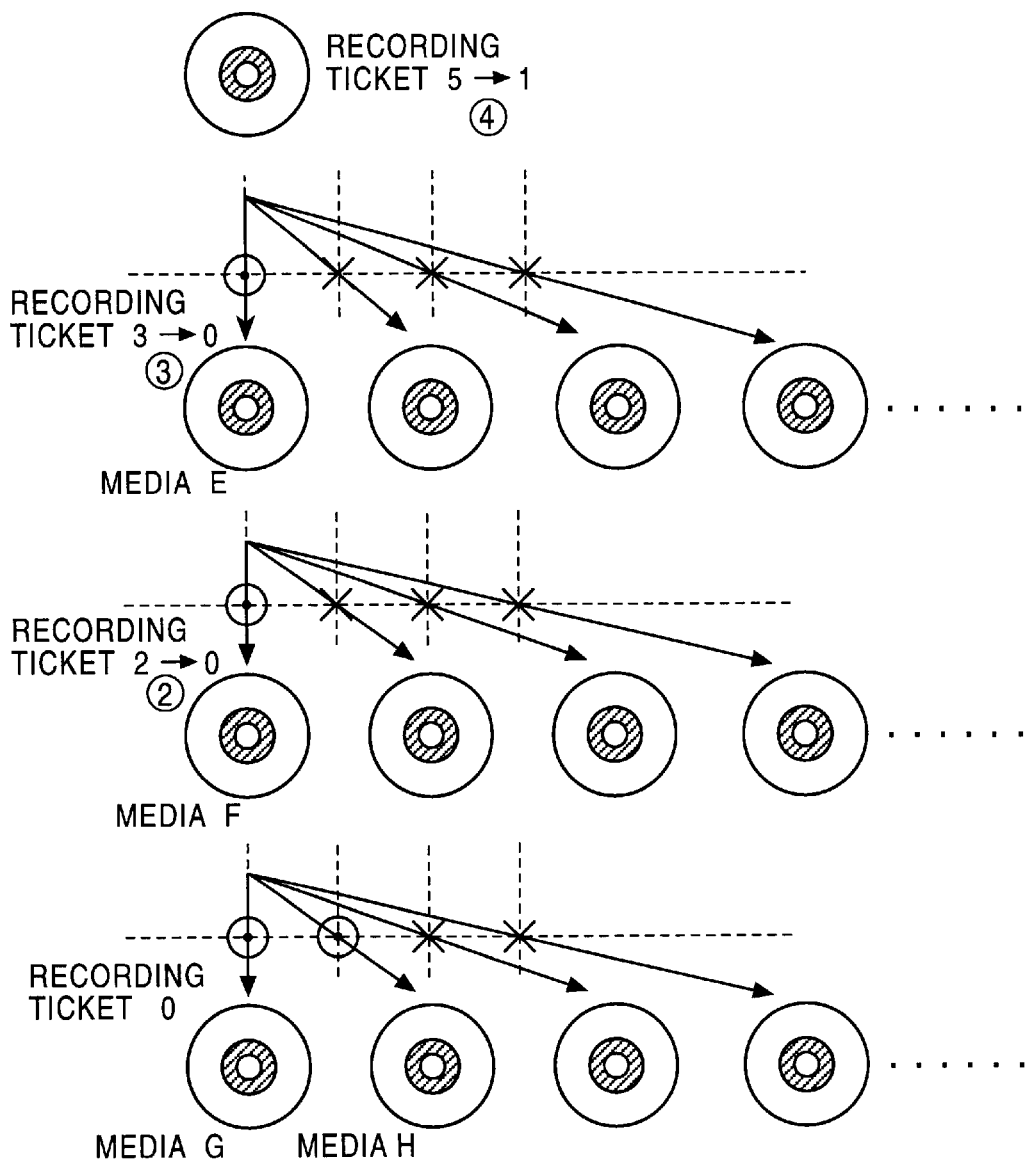
FIG. 20 is a fourth diagram for describing a specific usage form of the recording ticket shown in FIG. 16.

Next, in the example shown in FIG. 20, first, five recording tickets are purchased in the same manner as with FIGS. 18 and 19, following which one recording ticket is used to copy to media E, and three tickets are handed over to media E. Next, one recording ticket of media E is used to copy to media F, and further two tickets are handed over to media F. At this point, the number of tickets at the media E is zero, and media F has two tickets. Then, the two recording tickets are used to copy to media G and media H. Thus, the number of tickets at media F is zero, and also media G and H have zero tickets.

In an arrangement wherein such a recording ticket concept has been introduced, there is still not differentiation between personal recordings and recordings made for other individuals, so it might appear at first sight that the conventional problem is still present. However, the copying side has already paid the END service center 100 profit equivalent to the number of tickets at the time of purchasing the tickets, and the profits are returned to the copyright holder side, so there is no problem as far as copyrights go.

Next, the actual method for installing the recording tickets into the secure container will be described.

As described above, with the user home network secure container, the recording tickets held are recorded as conditions of use (policy), and the used state is recorded as a usage state (status), with both being listed as hash values passed through a hash function.

A hash function is a function wherein input of data of an arbitrary bit length is compressed to data of a predetermined bit length and output as a hash value; specifically, this is defined as shown in Expression (2):

Expression (2)

$$H(M) = h$$

wherein M represents input plaintext
(variable bit length);
H(x) is a hash function; and
h is a hash value (fixed bit length)

Hash functions have characteristics that it is difficult to predict input from the hash value, that many bits in the hash value change according to one bit changing in the data input to the hash function, and also that it is difficult to find input data having the same hash value.

In other words, calculation of (a)h is easy. In the event that (b)h is provided, finding the plaintext M wherein h=H(M) is mathematically difficult. In the event that (c)M is provided, finding the plaintext M wherein H(M)=H(M') with a different M' is mathematically difficult. These being the characteristics, normally, hash functions are used for generating signatures and verifying signatures.

Also, SHA-1, MD-5, etc., are used as actual hash functions.

With the EMD system 1 according to the present embodiment, a counter using this hash function is used for counting the number of times of the recording tickets.

Figure 21:
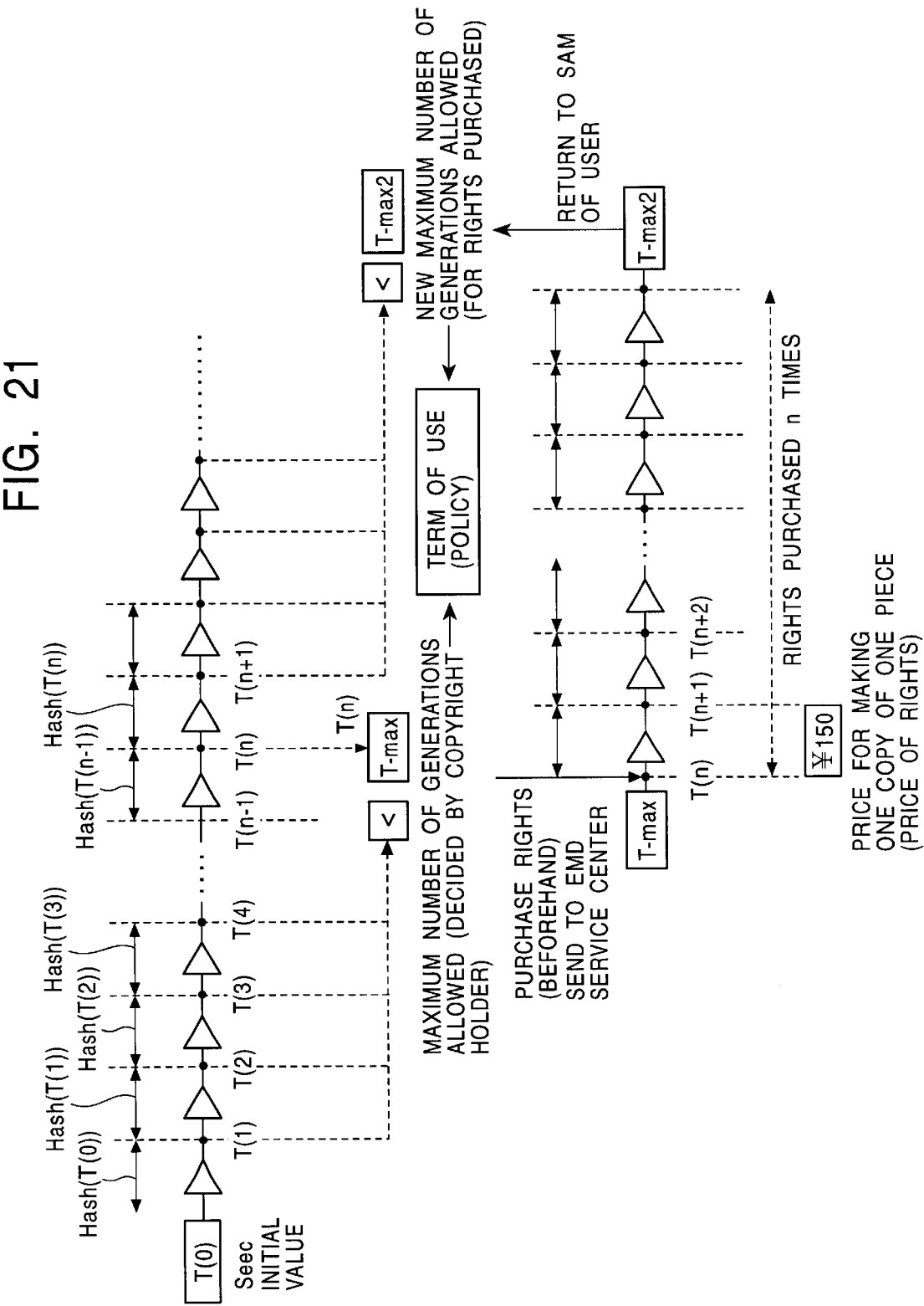
FIG. 21 is a diagram for describing the basic concept of the recording ticket using a hash function.

Reference will be made to FIG. 21 regarding description of how to apply the hash function to the recording tickets.

First, SeedT(0) which is the initial value of the ticket is defined.

This SeedT(0) is the unused state of the ticket at the time of purchasing. A hash value T(1) wherein this T(0) has been passed through a hash function once is the value of the ticket after performing one copy.

It is difficult to estimate the original hash value T(0) from the hash value T(1), due to the nature of hash functions, so once the ticket is passed through the hash function, it is not readily returned to the original state. Thus, there is security in that the recording tickets will not be tampered with.

At the time of performing the second copy, the first hash value is passed through a hash function again. The value of the ticket obtained at this time is the hash value T(2), and this value is the current value of the ticket after performing two copies. The same processing is repeated for the third and subsequent copies.

Accordingly, first, the value of the permitting recording ticket is set at a value wherein the initial value T(0) has been passed through a hash function by a number of times equal to the number of times that copying is to be permitted, the initial value T(0) is set at a value indicating the usage state, and each of these are listed in a secure container.

Subsequently, each time the recording tickets is used, the initial value is passed through a hash function and updated, thereby grasping the number of times of use by copying.

Then, at the time that the updated number of times of use by copying becomes equal to the permitting recording ticket value, this means that the number of times of copying use has reached the permitted number of times, and further copies cannot be made.

Thus, the recording ticket is installed in an actual secure container.

For example, in the event that the contents provider 200 sets the maximum number of permitted copy generations to n in the handling policy in the contents provider secure container, the value T(n) which is initial value SeedT(0) passed through the hash function for n times is obtained, and this is stored as the maximum number of tickets.

Also, in the event that the user has purchased a necessary number of tickets or the like with equipment having SAMs such as the communication recording/playing device 450 and recorder 453 of the user home network secure container, T(n) which is equivalent to the number of permitted generations and the initial value T(0) which is the current value are listed in the conditions of use (policy) and usage state (status) of the user home network secure container, as described above.

Then, the value obtained by passing the current value through the hash function once each time the user makes a copy is compared with the permitted number of generations, confirmation is made regarding whether or not this has exceeded the purchased number of tickets, and if not so, the copy action is permitted.

In the event that this has exceeded the purchased number of tickets, copying cannot be performed, so the user must either pay compensation to purchase a ticket on the spot, or give up on copying.

Also, the new current value is described in the status.

Thus, this state of purchasing and using recording tickets using the hash function will be described with reference to FIGS. 22 through 24.

Figure 22:
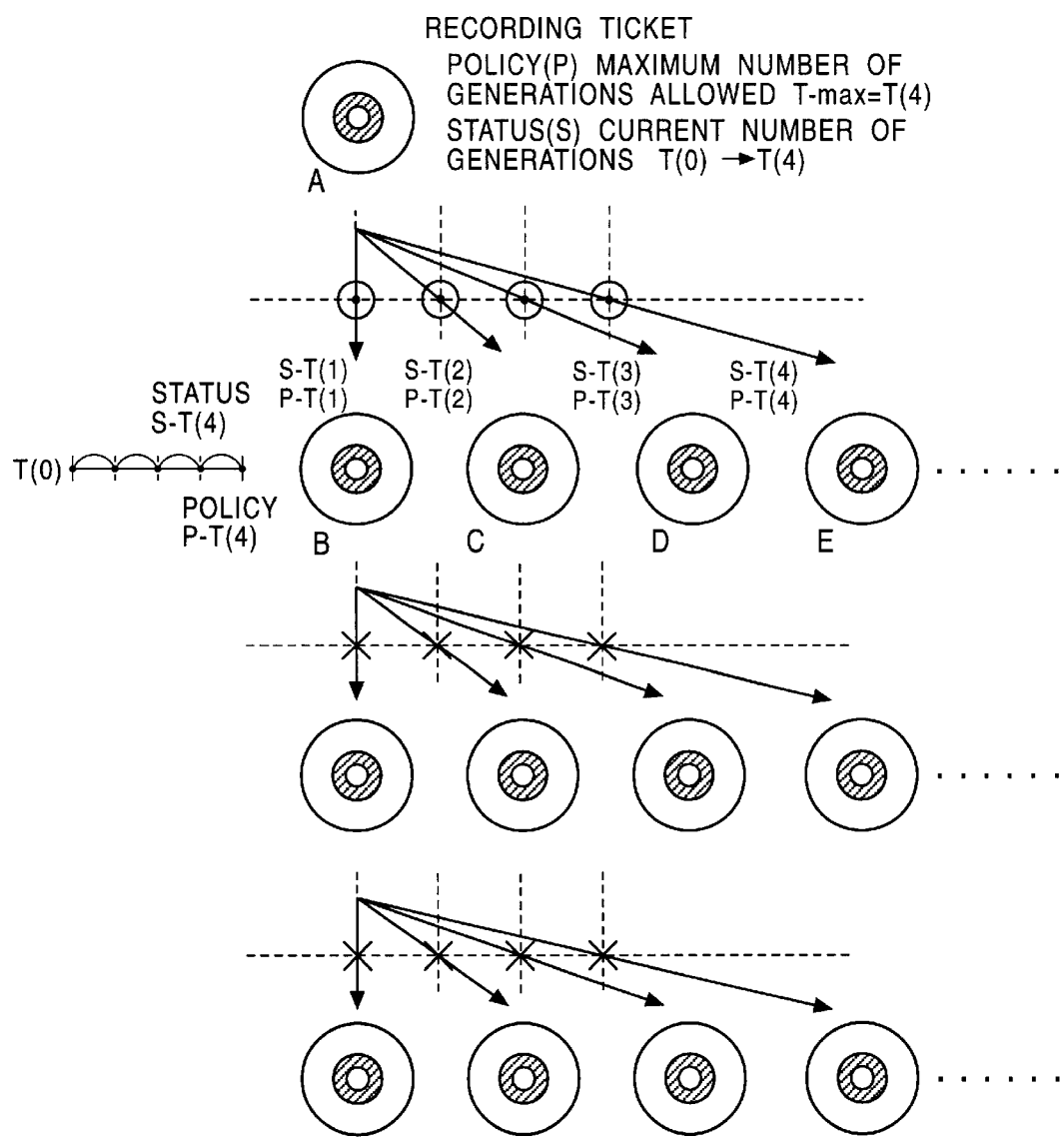
FIG. 22 is a first diagram for describing a specific usage form of the recording ticket using a hash function.

In FIG. 22, let us say that the media A has connected to the EMD service center via network and has purchased four recording tickets. The number of permitted generations T(4) and the initial value T(0) of the current value are sent from the EMD service center. With equipment provided with a SAM, the number of permitted generations T(4) is described to the conditions of use (policy), and the current value T(O) is described to the usage state (status).

The media A holds a ticket for one time at this point, and has the right to copy the number of times worth thereof, and can also performs copying offline since the compensation has been paid.

At the time of copying to the media B, the current value T(0) described to the usage state (status) is passed through the hash function once to obtain the current value T(1). Next, in the event that comparison is made with the number of permitted generations T(4) described in the conditions of use (policy) and confirmation is made that this has not been exceeded, copying is carried out. Then, the current state of the usage state (status) of the media A is updated with the new current value T(1), and this is recorded to the usage state (status) of the media B as the current value of the media B. Also, this T(1) is recorded to the usage state (status) as the number of permitted generations of the media B, as well. Accordingly, at this point, the media B is set at number of permitted generations=current value, so the number of recording tickets is zero.

In the case in FIG. 22, copying is performed from the media A to the media C, D, and E, in the same manner. With each, at the media A, a new current value T(j) (wherein j=2 through 4) is obtained by passing the current value T(i) (wherein i=1 through 3) through a hash function once, and in the event that confirmation is made that the value thereof does not exceed the number of permitted generations T(4) described in the conditions of use (policy), copying is carried out. Then, the current usage state (status) of the media A is updated with the new current value T(j), and this is also recorded to the conditions of use (policy) and the usage state (status), as the number of permitted generations and the current value of the media C, D, and E.

Consequently, the number of permitted generations and the current value of the media B, D, D, and E are T(1), T(2), T(3), and T(4), and the number of recording tickets is zero, and in this state contents are copied.

Also, accordingly, the current state of the original media A is T(4), so the number of recording tickets is zero.

Figure 23:
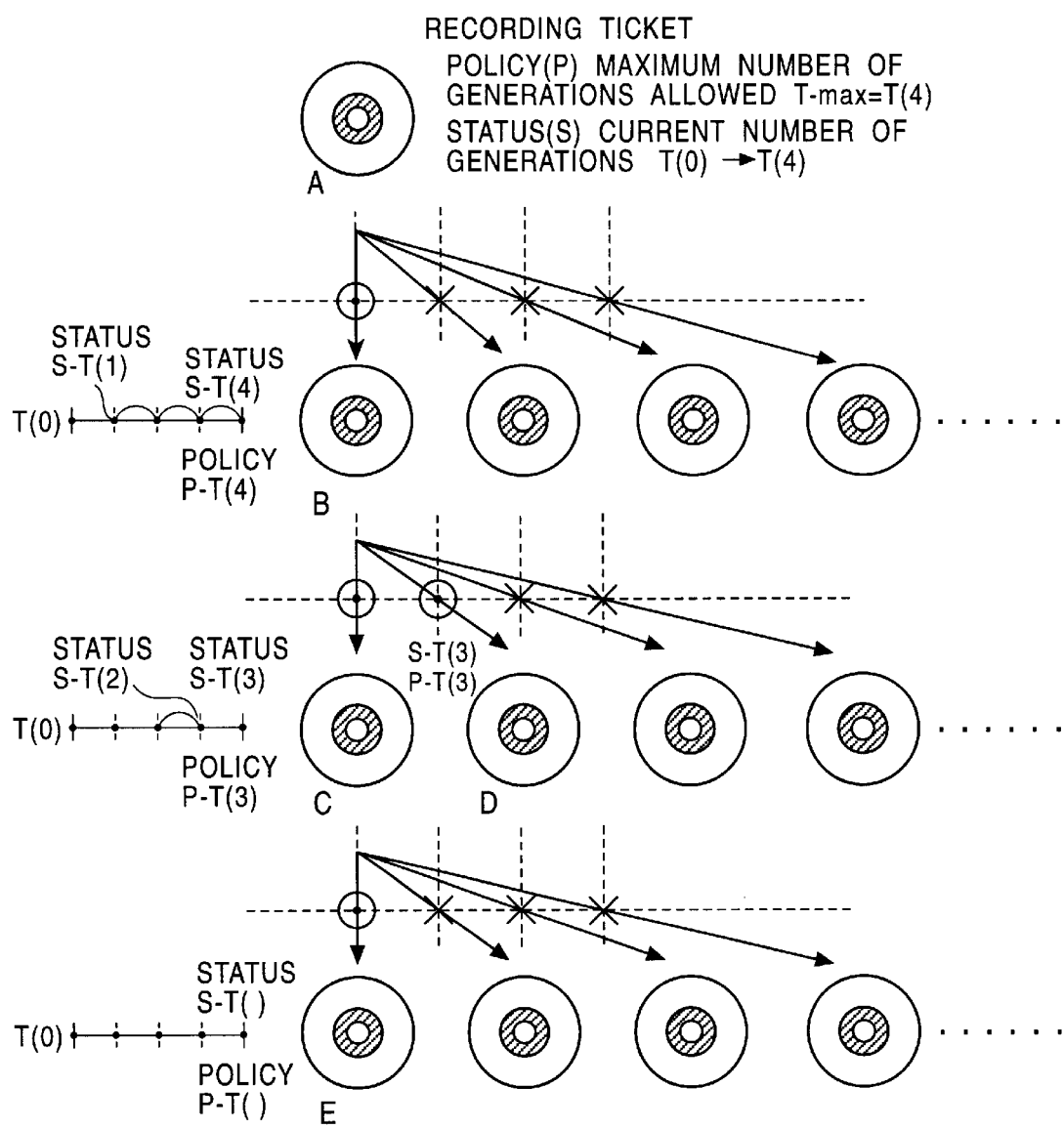
FIG. 23 is a second diagram for describing a specific usage form of the recording ticket using a hash function.

Also, in FIG. 23, the media A has purchased four recording tickets as in the case of FIG. 22, and following copying to media B, three recording tickets are handed over to media B.

In this case, following the copying to media B, the number of permitted generations T(1) of the media B is read out, the value T(4) wherein this has been passed through a hash function three times is obtained, and the number of permitted generations within the conditions of use (policy) of the media B are updated with this value. Consequently, the number of permitted generations of the media B is T(4), and the current value is T(1).

In FIG. 23, two of the recording tickets of this media B are used, and two parallel generations are copied to media C and media D.

That is, at media B, a new current value T(j) (wherein j=2, 3) is obtained by passing the current value T(i) (wherein i=1, 2) through a hash function once, and in the event that confirmation is made that the value thereof does not exceed the number of permitted generations T(4) described in the conditions of use (policy), copying is carried out to each media C and D. Then, the current state of the usage state (status) of the media B is updated with the new current value T(j), and this is also recorded to the conditions of use (policy) and the usage state (status), as the number of permitted generations and the current value of each media.

Then, with media B, further, the remaining one ticket is handed to media C. At media B, a new current value T(4) is obtained by passing the current value T(3) through a hash function once, and in the event that confirmation is made that the value thereof does not exceed the number of permitted generations T(4) described in the conditions of use (policy), the number of permitted generations T(2) for the media C is read out, a value T(3) is obtained by passing this through a hash function once, and this value is set as the number of permitted generations for the media C. Consequently, the number of permitted generations for the media C is T(3), the current value T(2), and there is one ticket held thereby.

Further, in FIG. 23, the contents are copied to the media E by the recording ticket of the media C.

That is, at media C, a new current value T(3) is obtained by passing the current value T(2) through a hash function once, and in the event that confirmation is made that the value thereof does not exceed the number of permitted generations T(3), copying is carried out to the media E. Then, the current state of the media C is updated with the new current value T(3), and T(3) is also recorded as the number of permitted generations and the current value of the media E.

Figure 24:
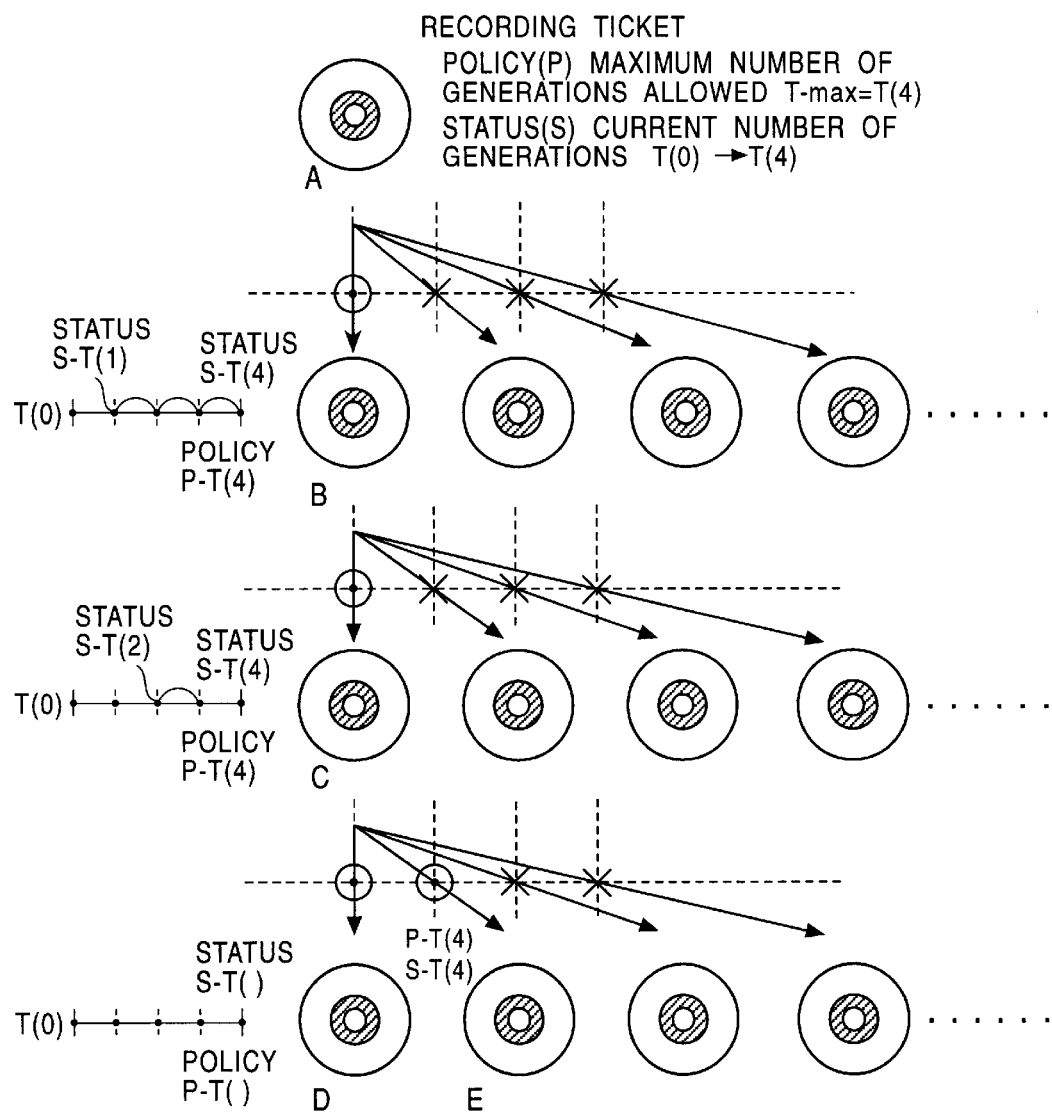
FIG. 24 is a third diagram for describing a specific usage form of the recording ticket using a hash function.

Also, in FIG. 24, the media A has purchased four recording tickets as in the case of FIG. 23, and following copying to media B and handing the three recording tickets over to media B, further, a copy is made from the media B to media C and two recording tickets are handed over.

In this case, following the copying from media B to media C, the new current value T(4) wherein the current value T(2) has been passed through a hash function twice is obtained at media B, and in the event that confirmation is made that the value thereof does not exceed the number of permitted generations T(4) described in the conditions of use (policy), the number of permitted generations T(2) for the media C is read out, a value T(4) is obtained by passing this through a hash function twice, and the number of permitted generations for the media C within the conditions of use (policy) is updated with this value. Consequently, the number of permitted generations for the media C is T(4), the current value T(2), and there are two recording tickets held thereby. Also, for the media B, both the number of permitted generations and the current value are T(4), and the number of recording tickets is zero.

In FIG. 24, the two parallel generation copies are made to the media D and E, using the two recording tickets of this media C.

That is, at media C, a new current value T(j) (wherein j=3, 4) is obtained by passing the current value T(i) (wherein i=2, 3) through a hash function once, and in the event that confirmation is made that the value thereof does not exceed the number of permitted generations T(4) described in the conditions of use (policy), copying is carried out to each media D and E. Then, the current state of the usage state (status) of the media C is updated with the new current value T(j), and this is also recorded to the conditions of use (policy) and usage state (status) as the number of permitted generations and the current value of each media.

Consequently, the number of permitted generations and the current value of media C, D, and E are the same, and the number of recording tickets is zero.

Note that at the point that the current value of the ticket exceeds the number of permitted generations, copying cannot be made at that point.

In the event that the user desires to purchase recording tickets again in such a case, the communication recording/playing device 450 within the user home network 400 connects to the EMD service center 100 via the network, the ticket T(n) with the number of permitted generations described in the conditions of use (policy) is returned to the EMD service center 100, and re-purchasing procedures are undertaken to apply for the necessary number of times.

At the EMD service center 100, billing data is confirmed regarding the returned ticket T(n) with the number of permitted generations, the ticket T(n) is passed through a hash function the requested number of times, and the ticket T'-max with the new number of permitted generations is returned to the communication recording/playing device 450 within the user home network 400.

The user writes the ticket T'-max with the new number of permitted generations to the conditions of use (policy), with T(n) which was the previous number of permitted generations as the current value. Consequently, the user has the right to copy up to the ticket T'-max with the new number of permitted generations.

Next, the control processing for using contents data using such recording tickets, and the operation of the EMD system 1 at this time, will be described with reference to FIGS. 25 through 30.

Here, the present invention will be described according to an example wherein the following processes are sequentially performed regarding a service provider securing container received from the service provider 300: the aforementioned uni-copying; purchasing new recording tickets; copying using the purchased tickets; and handing over recording tickets.

Figure 25:
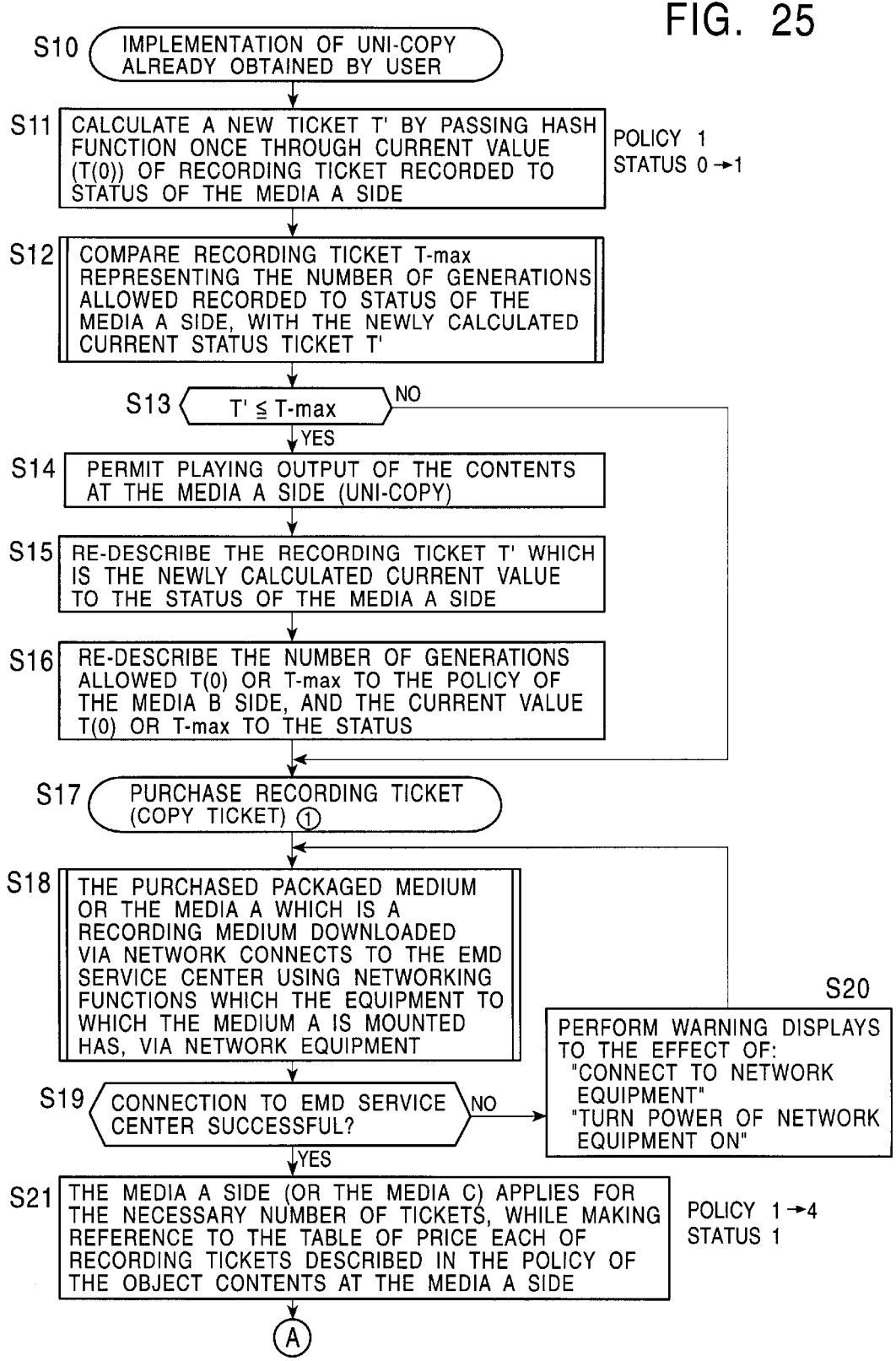
FIG. 25 is a first flowchart for describing the operation of the EMD system shown in FIG. 1, and the copy control processing of contents data using recording tickets.
Figure 26:
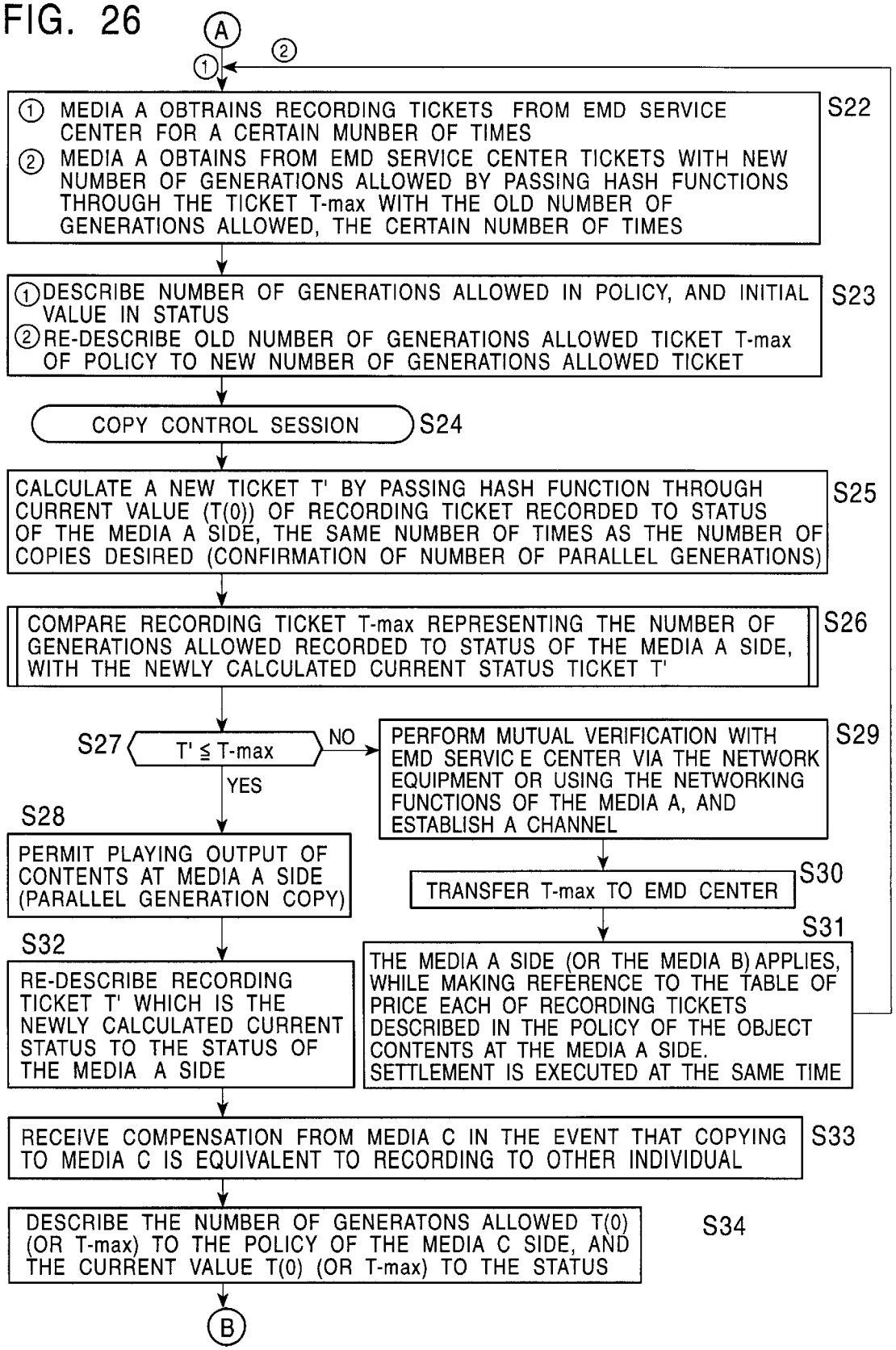
FIG. 26 is a second flowchart continuing from FIG. 25 for describing the operation of the EMD system shown in FIG. 1, and the copy control processing of contents data using recording tickets.
Figure 27:
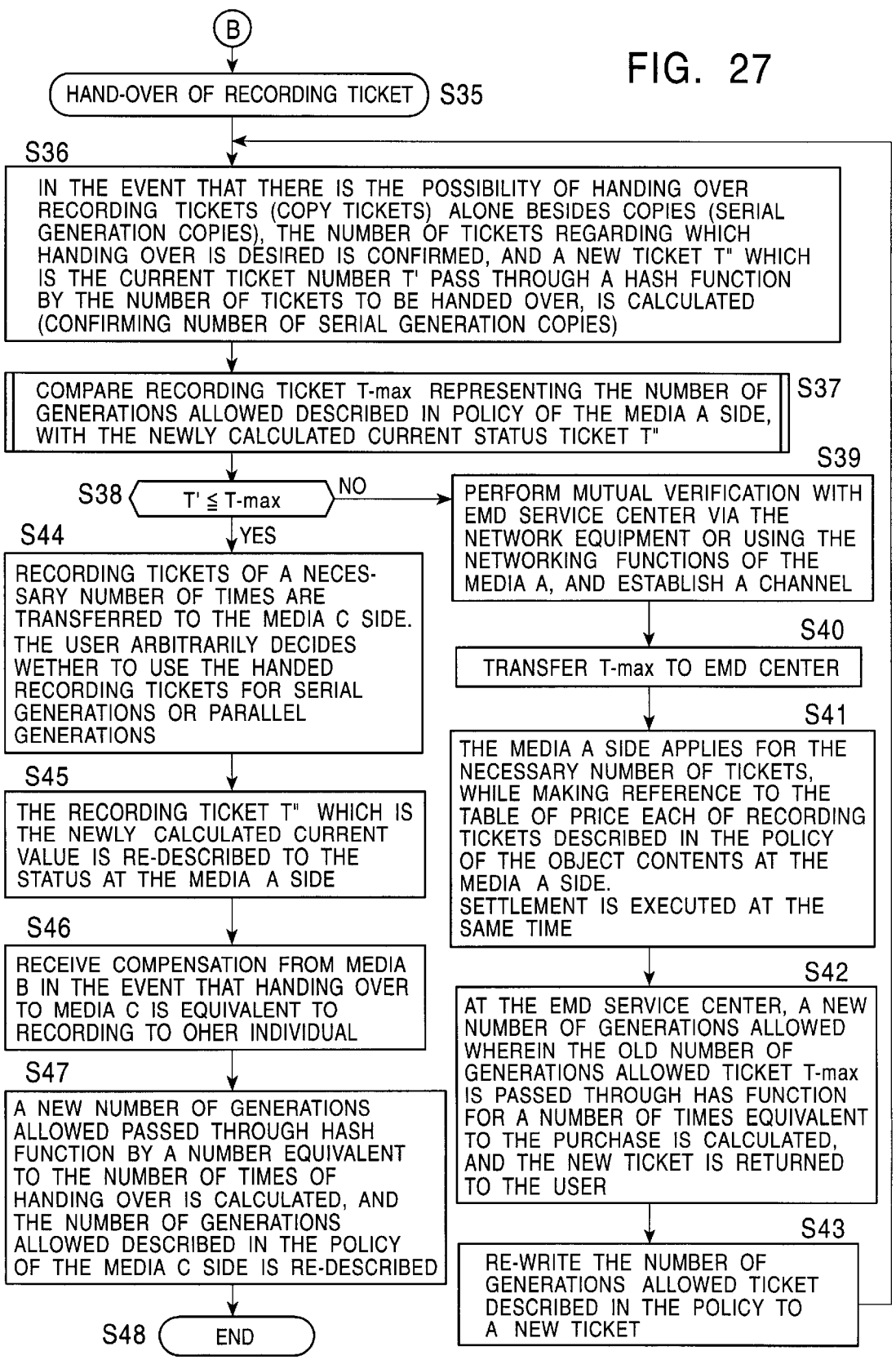
FIG. 27 is a third flowchart continuing from FIG. 26 for describing the operation of the EMD system shown in FIG. 1, and the copy control processing of contents data using recording tickets.
Figure 28:
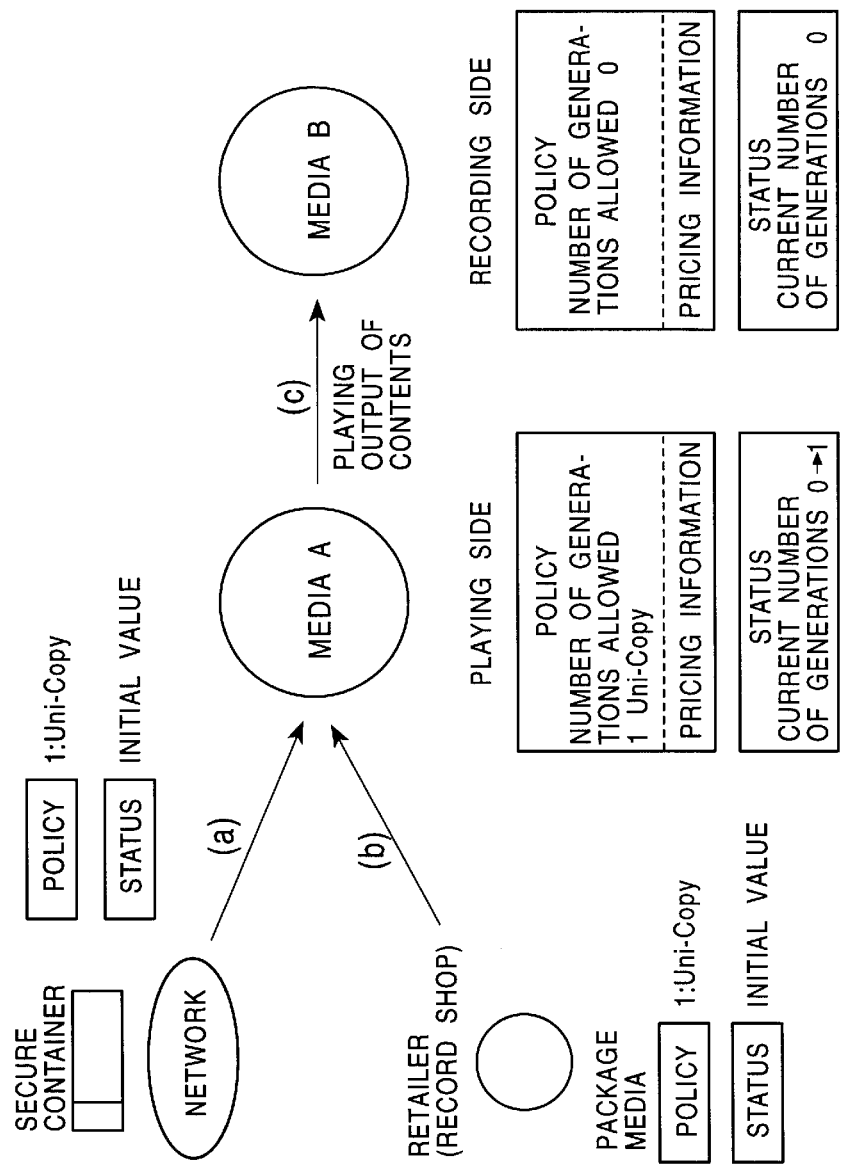
FIG. 28 is a first diagram for describing the operation of the EMD system shown in FIG. 1, and the copy control processing of contents data using recording tickets.
Figure 29:
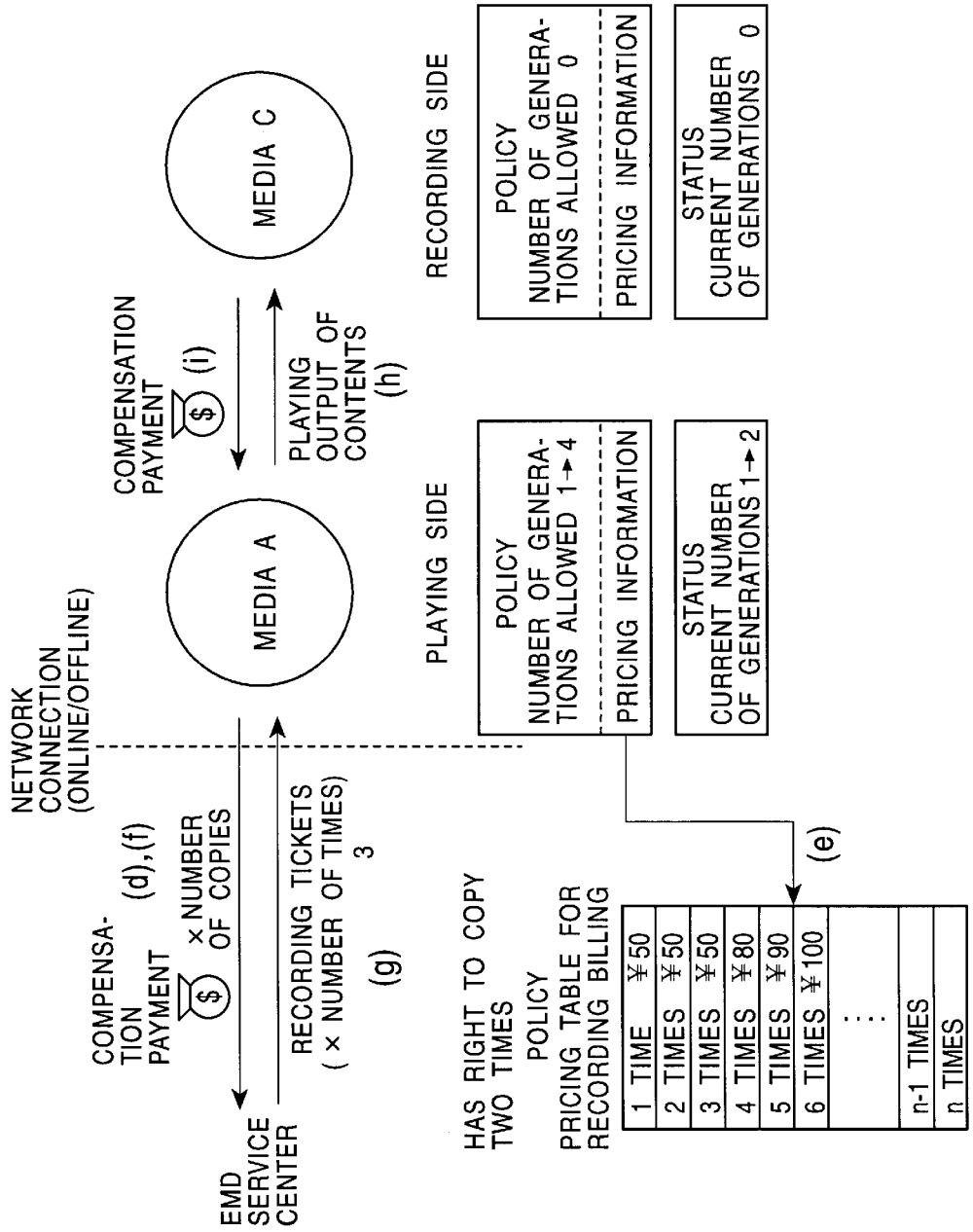
FIG. 29 is a second diagram for describing the operation of the EMD system shown in FIG. 1, and the copy control processing of contents data using recording tickets.
Figure 30:
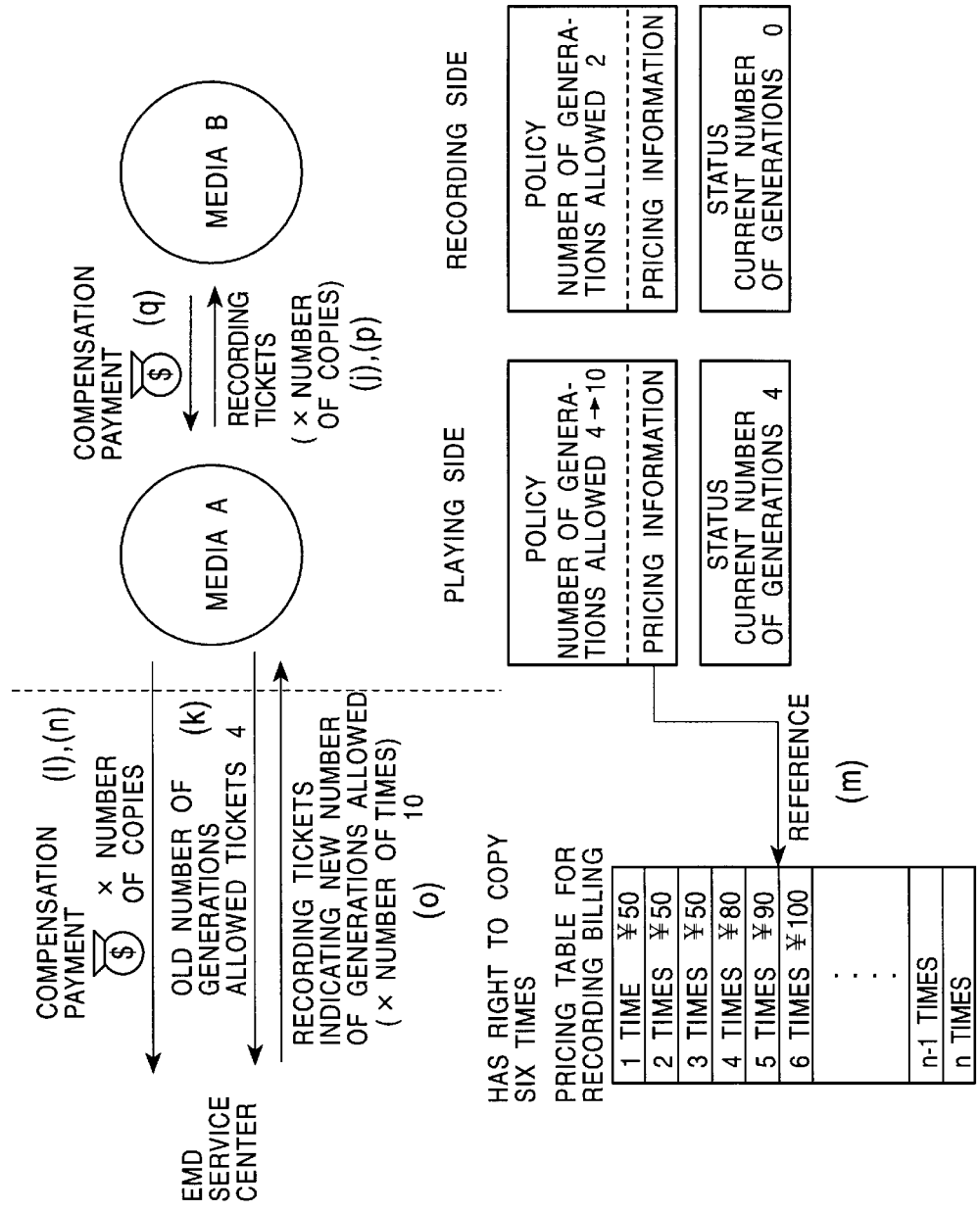
FIG. 30 is a third diagram for describing the operation of the EMD system shown in FIG. 1, and the copy control processing of contents data using recording tickets.

FIGS. 25 through 27 are flowcharts illustrating the procedures of the processes, and FIGS. 28 through 30 are diagrams for describing the processing. In the following description, the step Nos. represent the step Nos. in FIGS. 25 through 27, and (a) through (q) represent marks throughout FIGS. 28 through 30.

First, description will be made regarding the processing of executing a uni-copy (step S10) following receiving from the service provider 300 a service provider secure container that is capable of uni-copying as described above, via the network (a) or as a packaged media (b).

First, the current value T(0) of the recording ticket described in the usage state (status) of the media A is read out, passed through a hash function once, and a new ticket T' is calculated (step S11).

Next, the recording ticket $T_{-max}$ indicating the number of permitted generations described in the conditions of use (policy) of the media A is compared with the newly calculated ticket T' (step S12), and in the event that the new ticket T' has not exceeded the recording ticket $T_{-max}$ (step S13), playing output of the media A is permitted (step S14). Thus, the data is copied to the media B in the form of a secure container (c).

Then, the current value of the usage state (status) of the media A is updated at the new ticket T' (step S15), and the recording ticket $T_{-max}$ is recorded to the conditions of use (policy) and the usage state (status) of the media B (step S16).

Thus, the uni-copy of the service provider secure container obtained from the service provider 300 is completed.

In the event that the new ticket T' exceeds the recording ticket $T_{-max}$ in step S13, or in the event that there is a request to further copy to media C, the user must purchase recording tickets to perform the copy processing. Purchasing of the recording tickets will be described next (step S17).

In this case, first, connection to the EMD service center 100 is attempted via the network (step S18).

In the event that connection is not performed appropriately (step S19), a message such as "connect equipment to network" or "turn the power of the network equipment on" is output (step S20), the flow returns to step S18, and attempts to connect to the EMD service center 100 again.

In the event that connection with the EMD service center 100 succeeds in step S19, the equipment of the user home network 400 which desires the purchase applies to the EMD service center 100 regarding the necessary number of recording tickets (d), and at the same time, reference is made to the unit price of one recording ticket recorded in the pricing information of the service provider secure container (e), and settlement processing is carried out (step S21) (f).

In the event that the equipment applying for the recording tickets to the EMD service center 100 is the communication recording/playing device 450 which has communication functions, the communication recording/playing device 450 can apply on its own, and in the event that the applying equipment is a recorder 453 which does not have communications functions, the recorder 453 should apply via the communication recording/playing device 450. In the present embodiment, the media A carries out a session with the EMD service center 100, and obtains recording tickets.

In the event that new tickets are transmitted from the EMD service center 100 (g), the media A obtains this (step S22), updates the number of permitted generations of the conditions of use (policy) recorded in the service provider secure container with the obtained number of permitted generations, and sets the current value of the usage state (status) to the initial value (step S23).

Next, the processing for copying will be described based on the obtained number of permitted generations, i.e., on the recording ticket (step S24).

First, a new ticket T', wherein the current value T(0) of the recording ticket described in the usage state (status) of the media A is passed through a hash function by a number of times equal to the number of times that copying is desired, is calculated (step S25).

Next, the recording ticket $T_{-max}$ recorded in the conditions of use (policy) which is the number of permitted generations is compared with the newly calculated ticket T' (step S26), and in the event that the new ticket T' has not exceeded the recording ticket $T_{-max}$, i.e., in the event that the new ticket T' is smaller than the recording ticket $T_{-max}$, (step S27), playing output of the contents of the media A is permitted, and copying is performed to media C (step S28) (h).

Also, in the event that the new ticket T' has exceeded the recording ticket $T_{-max}$ (step S27), this means that there are not enough recording tickets, so connection is made with the EMD service center 100 via the network (step S29), and the recording ticket $T_{-max}$ is transferred to the EMD service center 100 (step S30). Then, at the same time of applying for the necessary tickets to the EMD service center 100, reference is made to the unit price of one recording ticket recorded in the pricing information of the service provider secure container, and settlement processing is carried out (step S31).

Then, the flow returns to step S22, where now with regard to the recording ticket sent at the EMD service center 100, a new number of permitted generations is generated by passing this original number of permitted generations through a hash function by a number of times equal to the number of recording tickets to be newly obtained, and the new number of permitted generations ticket is obtained (step S22). Then, the number of permitted generations in the conditions of use (policy) of the service provider secure container recorded, is updated by the obtained number of permitted generations (step S23), and the copy session from step S24 on is executed again.

Thus, once copying is performed to the media C in step S28, the new ticket T' is written to the current value of the usage state (status) of the media A (step S32).

Then, in the event that the media C is a device on another user home network 400 for example, which is equivalent to copying to another individual, compensation is received from the media C (step S33) (i), and the recording ticket $T_{-max}$ is recorded as the number of permitted generations in the conditions of use (policy) and the current value of the usage state (status) (step S34).

Next, description will be made regarding the processing of handing recording tickets to the media C as necessary, after completing copying to the media C (step S35).

In this case, first, the number of recording tickets to be handed over is confirmed, and a new ticket T', wherein the current value T of the usage state (status) of the recording ticket has been passed through a hash function by a number of times equal to the number of times that handing over is desired, is calculated (step S36).

Next, the recording ticket $T_{-max}$ recorded in the conditions of use (policy) which is the number of permitted generations is compared with the newly calculated ticket T' (step S37), and in the event that the new ticket T' has not exceeded the recording ticket $T_{-max}$, i.e., in the event that the new ticket T' is equal to or smaller than the recording ticket $T_{-max}$ (step S38), handing over of the copy is permitted, and the recording ticket is transferred to media C (step S39) (j).

Also, in the event that the new ticket T' has exceeded the recording ticket $T_{-max}$ (step S38), this means that there are not enough recording tickets, so connection is made with the EMD service center 100 via the network (step S39), and the recording ticket $T_{-max}$ transferred to the EMD service center 100 (step S40) (k). Then, at the same time as applying for the necessary recording tickets to the EMD service center 100, reference is made (m) to the unit price of one recording ticket recorded in the pricing information of the service provider secure container, and settlement processing is carried out (step S41) (n).

Consequently, the EMD service center 100 returns a new number of permitted generations wherein the sent ticket, i.e., the original number of permitted generations has been passed through a hash function by a number of times equal to the number of recording tickets to be newly obtained (step S42) (o), so the recording ticket indicating this number of permitted generations is obtained, and the number of permitted generations of the conditions of use (policy) is updated with the obtained number of permitted generations (step S43).

Then, the flow returns to the processing of confirming the number of recording tickets to be handed over in step S36, and subsequent processing.

Thus, once handing over of the recording ticket to media C in step S39 is performed, the new ticket T' is written to the current value of the usage state (status) of the media A (step S44).

Then, in the event that the media C is a device on another user home network 400 for example, and there is handing over of tickets to another individual, compensation is received from the media C (step S45) (q), and the number of permitted generations of the conditions of use (policy)of the media C is updated to a value passed through a hash function by a number of times equal to the number of tickets handed over (Step S46).

Thus, due to such processing, the series of uni-copying of the received service provider secure container, copying, obtaining recording tickets, and handing over recording tickets, is completed (step S47).

Finally, let us summarize the actions of the EMD system 1 once more.

At an EMD system 1 which distributes digital contents online, the contents provider 200 determines and describes a contents key to be managed by itself and handing policies regarding the contents, for each set of contents to be distributed. How many generations of rights to give to the user, how much the unit price of the recording tickets is to be, etc., are determined here by the copyright holder. Note however, that the price determined here is equivalent to the SRP (Suggested Retailer's Price), and that the actual sales price is set by the service provider.

The contents, contents key, and handling policies, are encapsulated as a contents provider secure container, and sent to the service provider 300 with encoding and electronic signature technology.

At the same time, the handling policy of the contents is sent to the EMD service center 100 for managing.

Next, the service provider 300 determines the margin profit for its own, determines the sales price by adding to the SRP, and transfers the sales price information to the EMD service center 100 to be managed.

The service provider 300 delivers the contents groups with service provider secure containers, using encoding and signature technology, over the network.

SAMs 462 which are rights processing modules are installed to the user terminals 450 and 453 of the user home network 400, for performing decoding processing of the containers, decoding the encoding and signatures on the contents, and performing billing processing.

At the time of purchasing contents, the user selects the desired purchasing format (recording billing, playing billing, purchasing, etc.), and this is recreated as conditions of use (policy) within the SAM 462. Subsequently, use of the contents by the purchaser is carried out based on the policy.

At the same time, billing information indicating the usage state of the actual contents are created within the SAM as usage state (status), and managed as user usage history and the like.

Then, this is transmitted to the EMD service center 100 as necessary, to be used for generating marketing data or post-operation settlement, etc.

Note that the number-of-times counting flag and the copy control session described here are installed as software parts to the storing module 473 which is secret memory within the right processing module SAM 462 installed in each home electronics device on the EMD system 1 which distributes digital contents online.

Thus, with the EMD system according to the present embodiment, the music data can be distributed while controlling the number of copies in both the parallel direction and the serial direction.

Particularly, this can also serve as having logical flag functions such as recording billing (pay-per-copy) for example, and billing can be made according to detailed use formats of the contents.

Also, with the EMD system 1, the media A at the playing side can connect to the EMD service center at the same time as purchasing contents and purchase a necessary number of recording tickets beforehand. Accordingly, an equivalent amount is returned to the copyright holder at this point, and the media A has the right to make as many copies as the number of recording tickets purchased, so subsequent copying can be performed offline, not connected to the network. That is, perpetual communication with the EMD service center 100 is not necessary, and settlement can be made offline.

Thus, the problems of the Serial Copy Management System (SCMS) which have been conventionally pointed out by the copyright holders side, i.e., problems due to the copy control bit configuration being that of two bits, such as (1) allowing infinite copy generations in the parallel generation direction, (2) no framework for monitoring both serial generations and parallel generations, (3) no framework for counting the number of times of copies, etc., can be all solved.

Conventionally, from the perspective of copyright holders, having copyrighted material copied under the current state with no system for returning profits meant great and immediate losses regarding sales of the product, and such actions were unacceptable. Particularly, there was a great danger than high-quality unauthorized copies would circulate in great numbers due to copying musical copyrighted material with digital recording technology, since there is no essential deterioration in quality.

However, in the event that a way to charge users profits such as with a recording billing (pay-per-copy) method as with the EMD system 1 according to the present embodiment, it is though that copying of copyrighted material would conversely lead to expanding business, which would be welcomed by the copyright holders.

That is, a copyright protecting system which the copyright holders which are the contents supplies can agree with, i.e., a business wherein copying returns profits to the copyright holders due to advancement of the network, can be realized.

Consequently, installing these functions into home electronics devices allows the home electronics business, which so far had been dependent on copying functions, to expand into the coming digital society in a sure manner.

That is to say, hardware device manufacturers can also maintain a good relationship with the copyright holders side in the digital age of home electronics as well, and expect further advancements in business.

Now, the present invention is by no means restricted to the present embodiment; rather, various suitable variations can be made.

For example, though the present embodiment has been described using number-of-times counting recording tickets (copy tickets) which manage both serial and parallel generations together, but an arrangement may be made wherein recording tickets (copy tickets) which manage serial and parallel generations separately are used.

Recording tickets which manage serial and parallel generations separately will be described with reference to FIGS. 31 through 33.

With this method, at the media which allows copying, all parallel generations are counted before counting the first serial generation.

Figure 31:
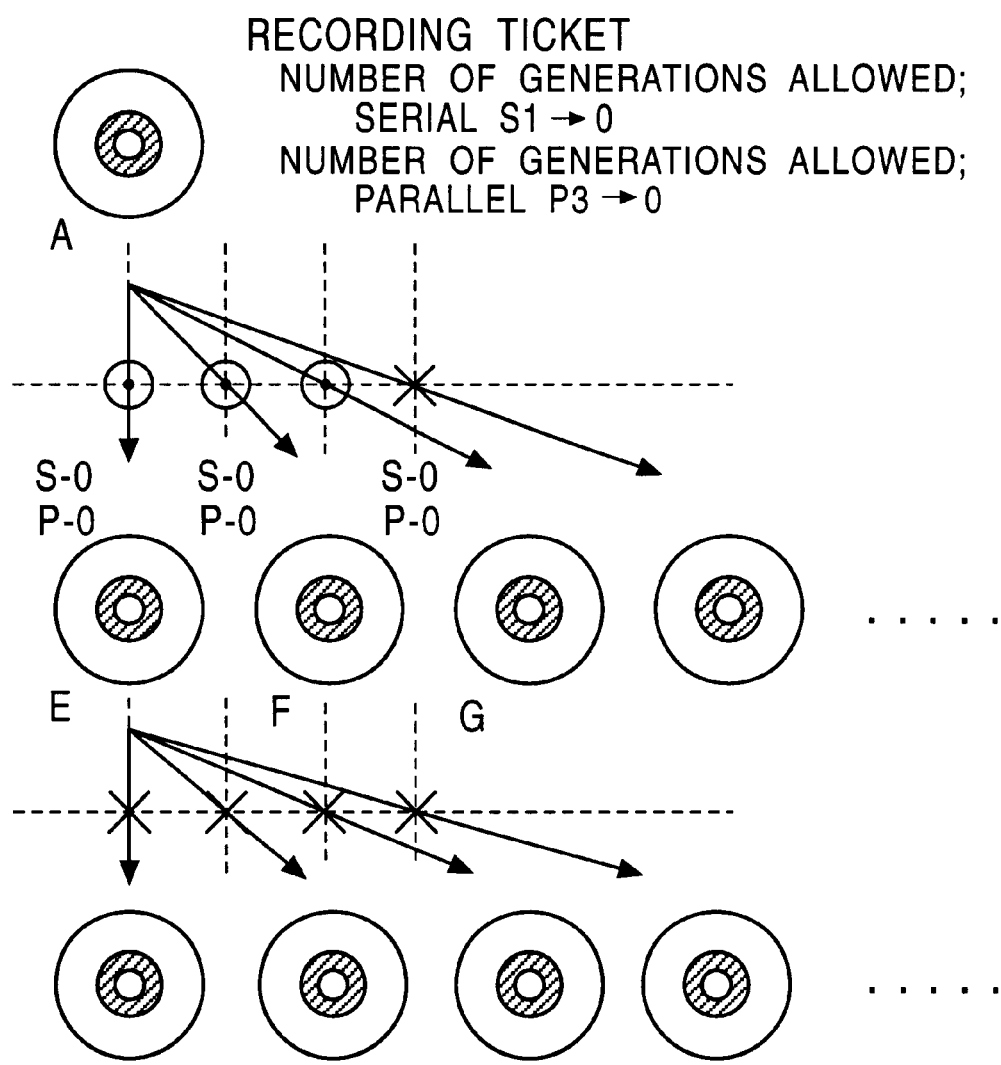
FIG. 31 is a first diagram for describing the processing using recording tickets for separately managing serial generations and parallel generations, in the EMD system shown in FIG. 1.

For example in the example shown in FIG. 31, the media A has a recording ticket permitting copying one generation in the serial generation direction and three generations in the parallel generation direction. Here, the tickets for the three parallel generations can be used to copy to the media E, F, and G. Then, after performing copying to the three media, the serial generation is counted one generation. Consequently, the serial generations and parallel generations of the recording tickets of the media A are all zero.

Figure 32:
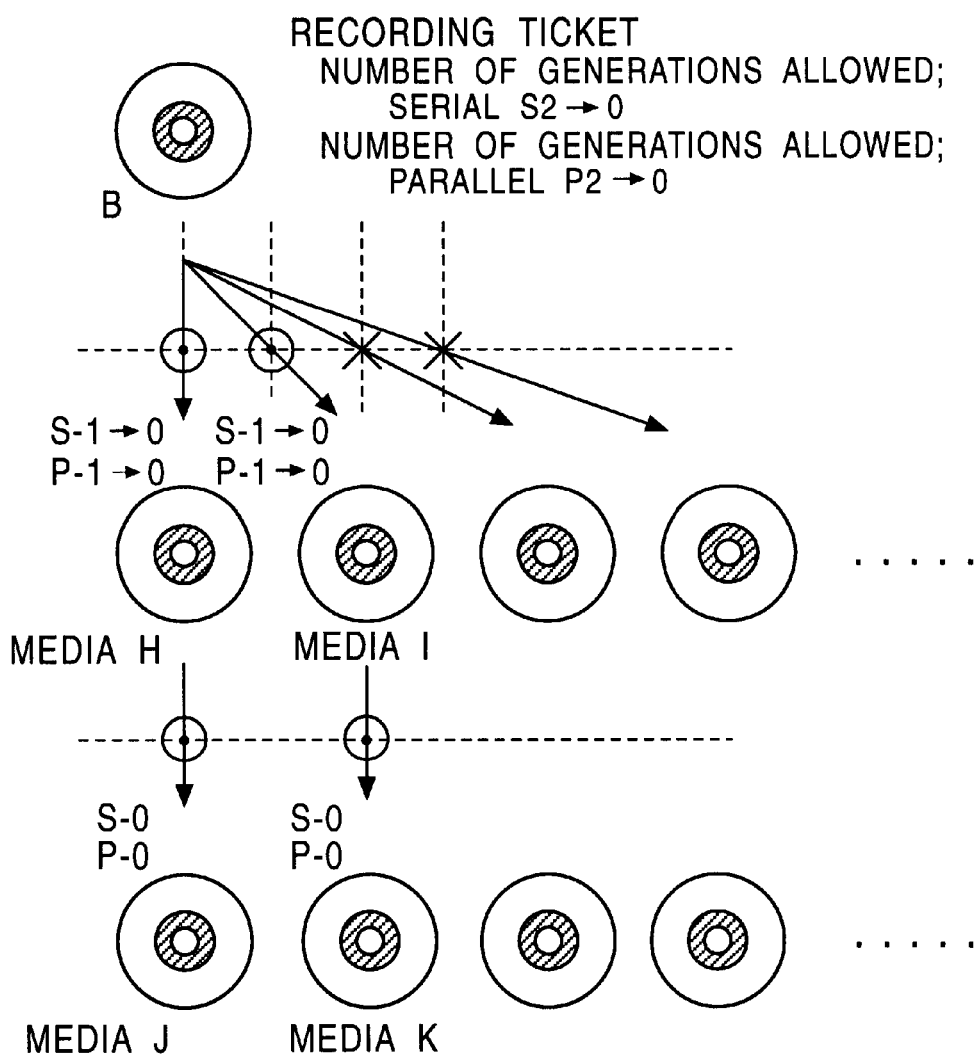
FIG. 32 is a second diagram for describing the processing using recording tickets for separately managing serial generations and parallel generations, in the EMD system shown in FIG. 1.

In the example shown in FIG. 32, the media B has a recording ticket permitting copying two generations in the serial generation direction and two generations in the parallel generation direction.

First, one recording ticket each in both the serial and parallel generations are used to copy to the media H and I, and at this point, one recording ticket each in the serial and parallel generations remain. Further, the remaining tickets for the one serial and parallel generation are handed over to the media H and I, and the media H and I use the tickets to further make copies to the media J and K.

Figure 33:
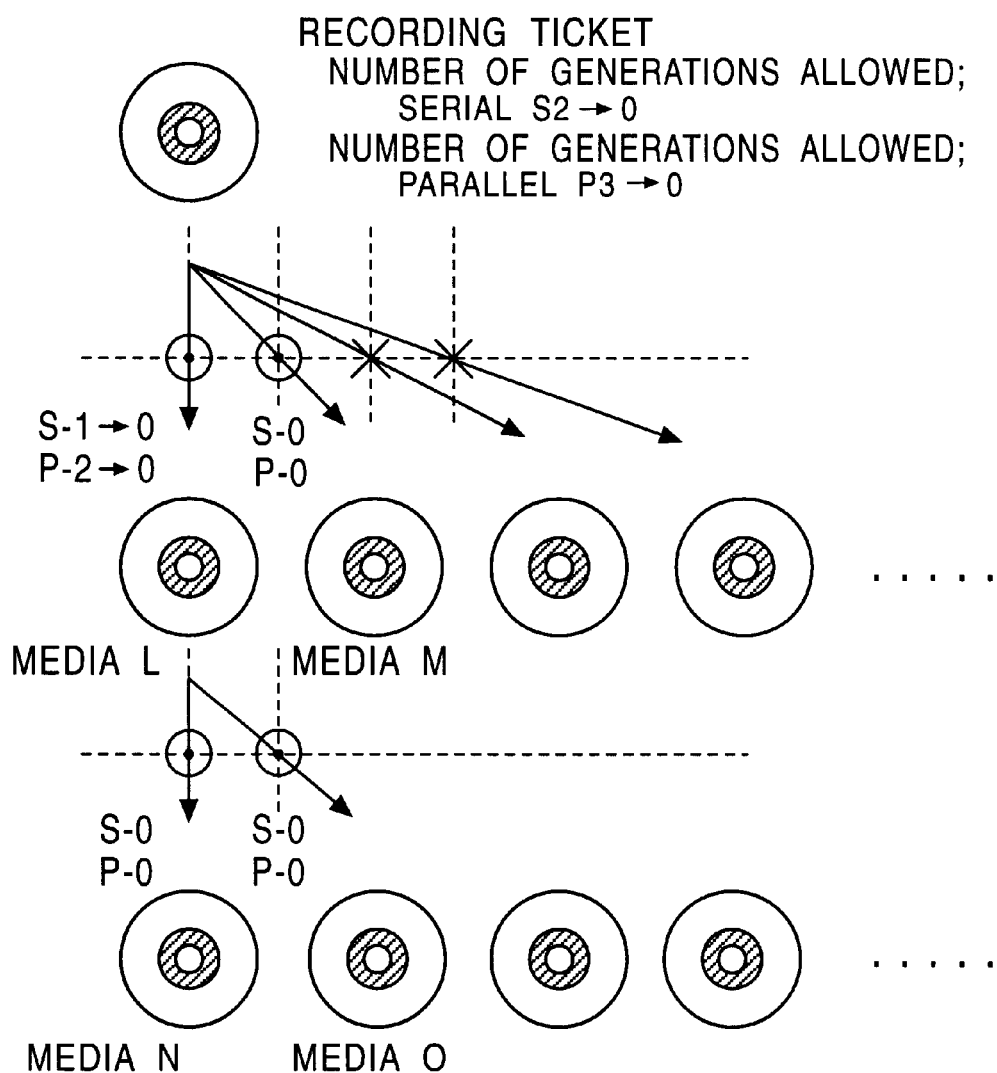
FIG. 33 is a third diagram for describing the processing using recording tickets for separately managing serial generations and parallel generations, in the EMD system shown in FIG. 1.
Figure 34:
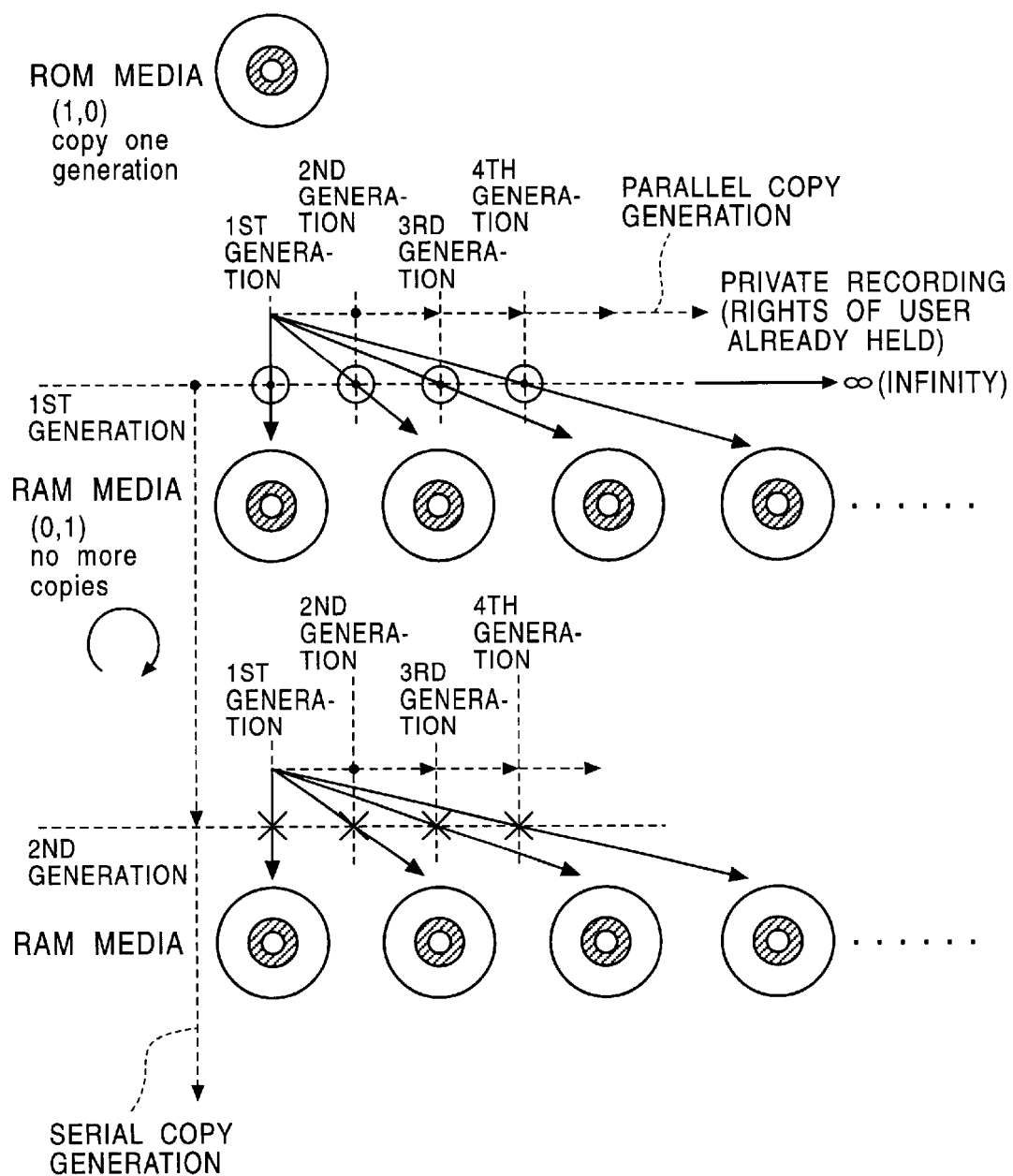
FIG. 34 is a diagram for describing conventional processing wherein copying is performed according to SCMS.

In the example shown in FIG. 33, the media C has a recording ticket permitting copying two generations in the serial generation direction and three generations in the parallel generation direction.

First, one recording ticket each in both the serial and parallel generations are used to copy to the media L and M, and at this point, the media C has remaining tickets with one generation in the serial generation direction and two generations in the parallel generation direction. Next, the remaining tickets are handed over to the media L. Consequently, the media M has no tickets and cannot make any more copies. The media L can make two generations of copies to the media N and O in the parallel generation direction. Note that at this time, one serial generation is counted.

In this way, even in the event that the number of permitted generation copies of the serial generations and parallel generations are managed separately, only the means of expression changes, and the basic concept is the same as the above arrangement for managing both together.

Further, copy control can be appropriately carried out in both the serial direction and parallel direction, with this sort of method, as well.

Also, the number of permitted generations and the current value to be set to the conditions of use (policy) and the usage state (status) following copying of the user home network secure container can be set to arbitrary values as long as the number of valid number of recording tickets based on the difference thereof is proper.

Immediately following copying, the number of permitted generations and the current value of the new media should be set to the same value with the number of recording tickets at zero. The number of permitted generations at the copy originating media, the current state before copying at the copy originating media, the current value following copying, a predetermined value, or other arbitrary values may be set to this value.

Also, while the above embodiment was described with an example of an arrangement wherein settlement is made before copying, post-copy settlement can be arranged for by keeping history of copies in the SAM, for example.

Information regarding what sorts of contents were copied to which media is stored in the storing module 473 which is secret memory within the SAM 462, in the equipment such as the communication recording/playing device 450 and the recorder 453 with SAMs installed.

Then, the history information is transferred to the EMD service center 100, either in the event that the amount of recorded history reaches a certain value, such as the upper limit level of the memory for example, or on a periodic basis. The EMD service center 100 manages a unit price table of the recording tickets, so the cost consumed on copies can be calculated from the recorded history that is transferred, and this amount drawn out of the bank account of the user.

The method for keeping recording history may utilizing the recording ticket system, or may use other systems.

Recording tickets are preferably issued in units of music pieces of the contents, but the present invention is not restricted to this. For example, rights to use music data may be provided in units of media, or in given monetary units.

Also, with the present embodiment, description has been made regarding a music data distribution system, but it is clearly understood that the present invention can be applied to arbitrary forms of copyrighted data such as image data, programs and normal data, and other arbitrary data communication.

For example, the present embodiment was used to describe the present invention using an example of an EMD system for distributing digital music data, but the present invention is by no means restricted to this; rather the present invention is capable of application to systems which distribute arbitrary contents, so long as the information is data which of itself has value.

As described above, according to the present invention, a data distribution system and method thereof capable of distributing arbitrary data such as data relating to copyrighted material such as music copyrighted material and picture copyrighted material for example, while performing appropriate copy control such as appropriate billing, for both serial generations and parallel generations, can be provided.

Also, a data processing device capable of using distributed arbitrary data such as data relating to distributed copyrighted material such as music copyrighted material and picture copyrighted material for example, while performing appropriate copy control such as appropriate billing, for both serial generations and parallel generations, can be provided.

Also, a data use control device which is mounted to a data processing device or the like, and is capable of using distributed arbitrary data such as data relating to copyrighted material such as music copyrighted material and picture copyrighted material for example, while performing appropriate copy control such as appropriate billing, for both serial generations and parallel generations, can be provided.

Further, a machine-readable recording medium on which is recorded distribution data, containing arbitrary contents data such as data relating to copyrighted material such as music copyrighted material and picture copyrighted material for example, capable of being used while performing appropriate copy control such as appropriate billing, for both serial generations and parallel generations, can be provided.

What is claimed is:

1. A data distribution system, comprising:
   a data distributing device which
      adds to desired contents data which is the object of distribution use control information containing information of the number of permitted times of use, which is the number of times that use including either one or both of recording and playing said contents data is to be permitted; and
      generates distribution data; and
   a data processing device which, based on the information of the number of permitted times of use of said contents data of said generated distribution data, detects whether or not the use of said contents data is permitted, uses said contents data in the event that use thereof is permitted, and updates said use control information so as to decrease said number of permitted times of use based on said usage;
   wherein said data processing device comprises a signal processing device wherein external observation and alteration of the signal processing state is impossible, and wherein said signal processing device performs detection of whether or not use of said contents data is permitted, control of use of said contents data based on said detection results, and updating of said use control information based on said use;
   wherein in the event of recording said contents data, said data processing device generates new distribution data by adding to said contents data said use control information containing said information of the number of permitted times of use that has been newly, and performs recording with said distribution data as a unit; and
   further comprising an administration device which is connected so as to be capable of communication with at least said data processing device, and which performs billing processing relating to the use of said contents data, based on information relating to use of said contents data sent from said data processing device;
   wherein said data processing device sends information relating to the use of said contents data to said administration device;
   wherein said data distributing device generates said distribution data by adding to said desired data information relating to the billing format whereby settlement can be made at said data processing device at the time of using said contents data, as said use control information;
   wherein said data processing device determines the billing format for use of said contents data, based on said information relating to billing format from said use control information of said distribution data;
   wherein said data processing device sends information relating to the determined billing format to said administration device;
   and wherein said administration device performs billing processing relating to use of said contents data, based on said information relating to billing format sent from said data processing device.

2. A data distribution system, comprising:
   a data distributing device which
      adds to desired contents data which is the object of distribution use control information containing information of the number of permitted times of use, which is the number of times that use including either one or both of recording and playing said contents data is to be permitted; and
      generates distribution data; and
   a data processing device which, based on the information of the number of permitted times of use of said contents data of said generated distribution data, detects whether or not the use of said contents data is permitted, uses said contents data in the event that use thereof is permitted, and updates said use control information so as to decrease said number of permitted times of use based on said usage;
   wherein said data processing device comprises a signal processing device wherein external observation and alteration of the signal processing state is impossible, and wherein said signal processing device performs detection of whether or not use of said contents data is permitted, control of use of said contents data based on said detection results, and updating of said use control information based on said use;
   wherein in the event of recording said contents data, said data processing device generates new distribution data by adding to said contents data said use control information containing said information of the number of permitted times of use that has been newly set, and performs recording with said distribution data as a unit; and
   wherein said data processing device sends information relating to the number of times of use of said contents data to said administration device;
   and wherein said administration device performs billing processing, based on said information relating to the number of times of use of said contents data that is sent.

3. A data distribution system, comprising:
   a data distributing device which adds to desired contents data which is the object of distribution use control information containing information of the number of permitted times of use, which is the number of times that use including either one or both of recording and playing said contents data is to be permitted; and generates distribution data; and a data processing device which, based on the information of the number of permitted times of use of said contents data of said generated distribution data, detects whether or not the use of said contents data is permitted, uses said contents data in the event that use thereof is permitted, and updates said use control information so as to decrease said number of permitted times of use based on said usage wherein said data processing device comprises a signal processing device wherein external observation and alteration of the signal processing state is impossible, and wherein said signal processing device performs detection of whether or not use of said contents data is permitted, control of use of said contents data based on said detection results, and updating of said use control information based on said use;

wherein in the event of recording said contents data, said data processing device generates new distribution data by adding to said contents data said use control information containing said information of the number of permitted times of use that has been newly, and performs recording with said distribution data as a unit; and further comprising an administration device which is connected so as to be capable of communication with at least said data processing device, and which performs billing processing relating to the use of said contents data, based on information relating to use of said contents data sent from said data processing device;

wherein said data processing device sends information relating to the use of said contents data to said administration device;

wherein said data distributing device generates said distribution data containing information of number of permitted times of use represented by a hash value obtained by passing a predetermined initial value through a hash function a number of times equal to the number of times that use is permitted;

and information of the essential number of times of use represented by said predetermined initial value as use control information;

and wherein said data processing device restricts use of said distribution data in the event that the hash value indicating the maximum number of times of use allowed and the hash value indicating the number of times of essential use become the same.

4. A data distribution system according to claim 3, wherein, in the event of attempting to newly obtain permission of use for a desired number of times regarding said distribution data which is already distributed, said data processing device sends a hash value indicating said number of permitted times of use to said administration device, and updates said use control information of said distribution data by a hash value indicating information permitting use of said desired number of times of use sent from said administration device;

and wherein said administration device obtains the hash value wherein the hash value indicating the number of times that use is permitted that has been sent is passed through a hash function a number of times equal to said desired number of times, and sends said hash value as information wherein said desired number of times of use has been further permitted, to said data processing device.

5. A data distribution method, which:

adds to desired contents data, in a manner wherein external operation is impossible, use control information containing information of the number of permitted times of use, which is the number of times that use of said contents data including either one or both of recording and playing said contents data is to be permitted, and generates distribution data;

distributes said distribution data to a desired distribution destination;

detects whether or not the use of said contents data of said distribution data is permitted, based on said use control information of said distributed distribution data, at said distribution destination;

uses said contents data in the event that use thereof is permitted as the result of said detection; and updates said use control information so as to decrease said number of permitted times of use according to said usage;

wherein detection of whether or not use of said contents data is permitted, control of use of said contents data based on said detection results, and updating of said use control information based on said use, are performed within a signal processing device regarding which external observation and alteration of the signal processing state is impossible;

wherein in the event that said contents data has been used, said distribution destination sends information relating to use of said contents data to a predetermined administration device;

wherein said administration device performs billing processing relating to use of said contents data, based on said generated information relating to use of said contents data; and wherein in the event of using said contents data by recording, this is performed by using as a unit;

said distribution data containing said contents data and said use control information containing said information of the number of permitted times of use that has been newly set;

wherein said distribution data contains information relating to the billing format for said contents data within said use control information; and wherein the billing format for use of said contents data is determined at said distribution destination, based on said information relating to the billing format of said use control information for said distribution data.

6. A data distribution method according to claim 5, wherein the billing format for use of said contents data of said distribution data is determined at the time of using said distributed distribution data for the first time.

7. A data distribution method according to claim 5, wherein the billing format for use of said contents data contains one, a plurality, or all, of:

a format wherein compensation is paid according to the number of times played;

a format wherein compensation is paid according to the number of times recorded;

a format wherein compensation is paid according to the number of times used;

a format, wherein regarding said formats wherein compensation is paid according to the number of times played, recorded, or used, payment of compensation is unnecessary after the number of times of playing, recording, or using has reached a predetermined number of times;

a format wherein compensation is paid beforehand for a predetermined number of times of playing;

a format wherein compensation is paid beforehand for a predetermined number of times of recording;

a format wherein compensation is paid beforehand for a predetermined number of times of use; and a format wherein compensation is paid beforehand for an unlimited number of times of use.

8. A data distribution method according to claim 5, wherein, with said format wherein payment of compensation is unnecessary after the number of times of playing, recording, or using has reached a predetermined number of times, the sum of compensation until the number of times of playing, recording, or using reaches a predetermined number of times is set so as to be higher than the compensation in the format wherein compensation is paid for an unlimited number of times of use.

9. A data distribution method, which:

adds to desired contents data, in a manner wherein external operation is impossible, use control information containing information of the number of permitted times of use, which is the number of times that use of said contents data including either one or both of recording and playing said contents data is to be permitted, and generates distribution data;

distributes said distribution data to a desired distribution destination;

detects whether or not the use of said contents data of said distribution data is permitted, based on said use control information of said distributed distribution data, at said distribution destination;

uses said contents data in the event that use thereof is permitted as the result of said detection; and updates said use control information so as to decrease said number of permitted times of use according to said usage;

wherein detection of whether or not use of said contents data is permitted, control of use of said contents data based on said detection results, and updating of said use control information based on said use, are performed within a signal processing device regarding which external observation and alteration of the signal processing state is impossible;

wherein in the event that said contents data has been used, said distribution destination sends information relating to use of said contents data to a predetermined administration device;

wherein said administration device performs billing processing relating to use of said contents data, based on said generated information relating to use of said contents data; and wherein in the event of using said contents data by recording, this is performed by using as a unit;

said distribution data containing said contents data and said use control information containing said information of the number of permitted times of use that has been newly set;

wherein said billing is not performed for the first recording after distribution of said distribution data.

10. A data distribution method, which:

adds to desired contents data, in a manner wherein external operation is impossible, use control information containing information of the number of permitted times of use, which is the number of times that use of said contents data including either one or both of recording and playing said contents data is to be permitted, and generates distribution data;

distributes said distribution data to a desired distribution destination;

detects whether or not the use of said contents data of said distribution data is permitted, based on said use control information of said distributed distribution data, at said distribution destination;

uses said contents data in the event that use thereof is permitted as the result of said detection; and updates said use control information so as to decrease said number of permitted times of use according to said usage;

wherein detection of whether or not use of said contents data is permitted, control of use of said contents data based on said detection results, and updating of said use control information based on said use, are performed within a signal processing device regarding which external observation and alteration of the signal processing state is impossible;

wherein in the event that said contents data has been used, said distribution destination sends information relating to use of said contents data to a predetermined administration device;

wherein said administration device performs billing processing relating to use of said contents data, based on said generated information relating to use of said contents data; and wherein in the event of using said contents data by recording, this is performed by using as a unit;

said distribution data containing said contents data and said use control information containing said information of the number of permitted times of use that has been newly set;

wherein said distribution data contains information of the number of times use has been permitted and the number of times essentially already used, as said use control information, with a hash value of a hash function; and wherein detection of whether or not use of said distribution data is permitted, and updating of information indicating the number of times said distribution data has already been essentially used based on use of said distribution data, are performed by comparing information of said number of permitted times of use with information of number of times already used, at said distribution destination.

11. A data distribution method according to claim 10, wherein information of the number of times use has been permitted is a hash value wherein a predetermined initial value has been passed through a hash function for a number of times equal to the number of permitted times of use;

and wherein information indicating the number of times essentially already used has said initial value thereof as said predetermined initial value;

and wherein each time said distribution data is used, a hash value indicating information of the number of times essentially already used is taken;

and wherein, in the event that the hash value indicating information of said number of permitted times of use becomes the same as the hash value indicating said number of times essentially already used, subsequent use of said distribution data is restricted.

12. A data distribution method according to claim 11, wherein in the event that said distribution destination is attempting to newly obtain permission of use for a desired number of times regarding said distribution data which is already distributed, a hash value indicating said number of permitted times of use to is sent said administration device;

and wherein said administration device obtains the hash value by further passing the hash value indicating information of the number of times that use is permitted that has been sent through a hash function a number of times equal to said desired number of times;

and wherein said hash value is sent to said distribution destination;

and wherein said distribution destination stores the hash value sent from said administration device indicating the number of times that use is permitted as information of said use control information of said distribution data.

13. A data processing device, comprising:

control information extracting means for extracting, from distribution data wherein use control information containing information of the number of permitted times of use of said contents data including either one or both of recording and playing said contents data has been added to desired contents data, information of the number of permitted times of use from said use control information;

use permitting means for detecting whether or not use of said content data is permitted, based on said extracted information of the number of permitted times of use;

use control means for controlling said use so as to use said contents data in the event that use thereof is permitted as the result of said detection;

using means for using said contents data based on said control; and control information updating means for updating said use control information so as to decrease said number of permitted times of use, based on said usage;

wherein said control information extracting means, said use permitting means, said use control means, and said control information updating means are configured of a signal processing device regarding which external observation and alteration of the signal processing state is impossible;

wherein said use permitting means detects whether or not playing of said contents data is permitted, based on said extracted information of the number of permitted times of use;

wherein said use control means controls said using means so as to play said contents data in the event that playing thereof is permitted as the result of said detection;

wherein said using means plays said contents data based on said control; and wherein said control information updating means updates said use control information based on said playing; and further comprising distribution data generating means for adding use control information containing said information of the number of permitted times of use that has been newly set to a predetermined value to said contents data, thereby generating new distribution data;

wherein said use permitting means detects whether or not recording of said contents data is permitted, based on said extracted information of the number of permitted times of use;

wherein said use control means controls said distribution data generating means and said using means so as to record said contents data in the event that recording thereof is permitted as the result of said detection;

wherein said distribution data generating means generates new distribution data using said contents data which is the object of recording;

wherein said using means records new distribution data generated based on said control; and wherein said control information updating means updates said use control information based on said new generation of distribution data and said recording.

14. A data processing device according to claim 13, wherein said distribution data contains information of number of permitted times of use by recording of said distribution data;

and wherein said use permitting means detects whether or not recording of said contents data is permitted, based on said information of the number of permitted times of use by recording of said distribution data at the recording originating side;

and wherein said distribution data generating means sets the number of permitted times of use by said recording of the generated distribution data, based on said information of the number of permitted times of use by recording of said distribution data at said recording originating side;

and wherein said using means records new distribution data generated;

and wherein said control information updating means updates said use control information based on the recording of said distribution data, and the number of permitted times of use by recording set to said recorded distribution data.

15. A data processing device according to claim 13, wherein said distribution data separately comprises information of number of permitted times of using said distribution data as original data for recording, and information of number of permitted times of using by recording for setting said distribution data as distribution data for recording as original data;

and wherein said use permitting means detects whether or not recording of said contents data is permitted, based on information of the number of permitted times of use by recording of said distribution data as original data;

and wherein said distribution data generating means sets the number of permitted times of use by recording of the generated distribution data, based on information of number of permitted times of using by recording for setting said distribution data as distribution data for recording as original data;

and wherein said using means records said generated new distribution data;

and wherein said control information updating means updates said use control information based on the recording of said distribution data, and the number of permitted times of use by said recording set to said recorded distribution data.

16. A data processing device according to claim 13, further comprising communication means for communicating with an administration device which performs billing processing relating to use of said contents data, and sending information relating to use of said contents data to said administration device.

17. A data processing device according to claim 16, wherein said communication means transmits information relating to use of said contents data to said administration device each time said contents data is used.

18. A data processing device according to claim 16, further comprising storing means provided within a signal processing device wherein said external observation and alteration of the signal processing state is impossible, for sequentially storing information relating to use of said contents data generated each time contents data is used;

wherein said communication means performs batch transmission of stored said information relating to use of said contents data, to said administration device, at a predetermined timing.

19. A data processing device according to claim 13, wherein, in the event of using said distribution data by recording;

said distribution data generating means generates distribution data containing said use control information wherein the number of permitted times of use by recording is set to zero;

said using means records said generated distribution data; and said control information updating means updates the information of the number of permitted times of use by recording for the original distribution data, based on recording of said generated, distribution data.

20. A data processing device according to claim 13, wherein, in the event of using said contents data by recording;

said distribution data generating means generates said distribution data containing said use control information containing information wherein the number of permitted times of use of said contents data is set to a predetermined value smaller than the number of permitted times of use by recording of the original distribution data;

said using means records said newly generated distribution data; and said control information updating means updates the information of the number of permitted times of use by recording for the original distribution data, based on recording of said new distribution data and the number of permitted times of use by recording set to said new distribution data.

21. A data processing device according to claim 16, wherein, in the event of newly increasing the number of permitted times of use of said distribution data which has already been distributed, said communication means transmits information to said administration device for requesting a desired number of times of use of said contents data, and receives a response to said request from said administration device;

and wherein in the event that said received response is such that permits said request, said control information updating means increases the number of permitted times of use of said distribution data which has already been distributed by the maximum number of times allowed.

22. A data processing device according to claim 16, wherein, in the event of using said contents data by recording, said communication means transmits information to said administration device for requesting a desired number of times of use of said contents data set to distribution data to be recorded, and receives a response to said request from said administration device;

and wherein in the event that said received response is such that permits said request, said distribution data generating means generates new distribution data by adding to the contents data said use control information containing information of the number of permitted times of use with value of the maximum number of times allowed set thereto;

and wherein said using means records said generated new distribution data.

23. A data processing device according to claim 16, wherein distribution data contains information relating to the billing format for use of contents data, as said use control information;

and further comprises billing format deciding means for deciding the billing format for use of said contents data, based on information relating to said billing format of said distribution data that has been distributed;

wherein said communicating means sends information relating to said decided billing format to said administration device.

24. A data processing device according to claim 16, wherein said distribution data comprises:

information of maximum number of permitted times of use represented by a hash value obtained by passing a predetermined initial value through a hash function a number of times equal to the maximum number of times that use is permitted;

and information of the number of times essentially already used represented by the initial value which is passed through a hash function each time used as said predetermined initial value as said use control information;

and wherein said use permitting means restricts use of said distribution data in the event that the hash value indicating information of said maximum number of times of use allowed and the hash value indicating information of said number of times of essential use become the same;

and wherein said control information updating means takes the hash value of the information of the number of times essentially already used, each time said distribution data is used, and updates.

25. A data processing device, comprising:

control information extracting means for extracting, from distribution data wherein use control information containing information of the number of permitted times of use of said contents data including either one or both of recording and playing said contents data has been added to desired contents data, information of the number of permitted times of use from said use control information;

use permitting means for detecting whether or not use of said content data is permitted, based on said extracted information of the number of permitted times of use;

use control means for controlling said use so as to use said contents data in the event that use thereof is permitted as the result of said detection;

using means for using said contents data based on said control; and control information updating means for updating said use control information so as to decrease said number of permitted times of use, based on said usage;

wherein said control information extracting means, said use permitting means, said use control means, and said control information updating means are configured of a signal processing device regarding which external observation and alteration of the signal processing state is impossible;

wherein said use permitting means detects whether or not playing of said contents data is permitted, based on said extracted information of the number of permitted times of use;

wherein said use control means controls said using means so as to play said contents data in the event that playing thereof is permitted as the result of said detection;

wherein said using means plays said contents data based on said control; and wherein said control information updating means updates said use control information based on said playing; and further comprising display means for displaying arbitrary information of said use control information of said distributed distribution data, and information based on said information.

26. A data use control device provided to a device which uses said contents data of distribution data wherein
use control information containing information of the number of times that use of said contents data including either one or both of recording and playing said contents data is to be permitted, is added to desired contents data to be distributed;
said data use control device comprising:
control information extracting means for extracting, from said distributed distribution data, information of the number of permitted times of use of said use control information;
use permitting means for detecting whether or not use of said content data is permitted, based on said extracted information of the number of permitted times of use;
use control means for controlling use so as to use said contents data in the event that use thereof is permitted as the result of said detection;
control information updating means for updating said use control information so as to decrease said number of permitted times of use, based on said usage, in the event that said contents data is used; and
a signal processing device regarding which external observation and alteration of the signal processing state is impossible:
wherein said use permitting means detects whether or not playing of said contents data is permitted, based on said extracted information of the number of permitted times of use;
wherein said use control means controls said use so as to play said contents data in the event that playing thereof is permitted as the result of said detection; and
wherein said control information updating means updates said use control information based on said playing; and
further comprising distribution data generating means for adding use control information containing said information of the number of permitted times of use that has been newly set to a predetermined value to said contents data, thereby generating new distribution data;
wherein said use permitting means detects whether or not recording of said contents data is permitted, based on said extracted information of the number of permitted times of use;
wherein said use control means controls said distribution data generating means so as to record said contents data in the event that recording thereof is permitted as the result of said detection;
wherein said distribution data generating means generates said new distribution data using said contents data which is the object of recording; and wherein said control information updating means updates said use control information based on said new generation of distribution data and said recording.

27. A data use control device according to claim 26, wherein said distribution data contains information of the number of permitted times of use by recording of said distribution data;
and wherein said use permitting means detects whether or not recording of said contents data is permitted, based on said information of the number of permitted times of use by recording of said distribution data at the recording originating side;
and wherein said distribution data generating means sets the number of permitted times of use by recording of the generated distribution data, based on information of the number of permitted times of use by said recording of said distribution data at said recording originating side;
and wherein said control information updating means updates said use control information based on the recording of said distribution data, and the number of permitted times of use by recording set to said recorded distribution data.

28. A data use control device according to claim 26, wherein said distribution data separately comprises information of number of permitted times of using said distribution data as original data for recording, and information of number of permitted times of using by recording for setting said distribution data as distribution data for recording as original data;
and wherein said use permitting means detects whether or not recording of said contents data is permitted, based on information of the number of permitted times of use by recording of said distribution data as original data;
and wherein said distribution data generating means sets the number of permitted times of use by recording of the generated distribution data, based on information of number of permitted times of using by recording for setting said distribution data as distribution data for recording as original data;
and wherein said control information updating means updates said use control information based on the recording of said distribution data, and the number of permitted times of use by said recording set to said recorded distribution data.

29. A data use control device according to claim 26, further comprising communication control means for controlling communication with an administration device which performs billing processing relating to use of said contents data, and sending information relating to use of said contents data to said administration device.

30. A data use control device according to claim 29, wherein said communication control means transmits information relating to use of said contents data to said administration device each time said contents data is used.

31. A data use control device according to claim 29, further comprising storing means for sequentially storing information relating to use of said contents data generated each time contents data is used;
wherein said communication control means performs batch transmission of stored information relating to use of said contents data, to said administration device, at a predetermined timing.

32. A data use control device according to claim 26, wherein, in the event of using said distribution data by recording;

said distribution data generating means generates distribution data containing said use control information containing information wherein the number of permitted times of use by recording is set to zero;

and said control information updating means updates the information of the number of permitted times of use by recording for the original distribution data, based on recording of said generated distribution data.

33. A data use control device according to claim 26, wherein, in the event of using said contents data by recording;

said distribution data generating means generates said distribution data containing said use control information containing information wherein the number of permitted times of use of contents data is set to a predetermined value smaller than the number of permitted times of use by recording of the original distribution data;

and said control information updating means updates the information of the number of permitted times of use by recording for the original distribution data, based on recording of said new distribution data and the number of permitted times of use by recording set to said new distribution data.

34. A data use control device according to claim 32, wherein, in the event of newly increasing the number of permitted times of use of said distribution data which has already been distributed, said communication control means transmits information to said administration device for requesting a desired number of times of use of said contents data, and receives a response to said request from said administration device;

and wherein in the event that said received response is such that permits said request, said control information updating means increases the number of permitted times of use of said distribution data which has already been distributed by the maximum number of times allowed.

35. A data use control device according to claim 32, wherein, in the event of using said contents data by recording, said communication control means transmits information to said administration device for requesting a desired number of times of use of contents data set to distribution data to be recorded, and receives a response to said request from said administration device;

and wherein in the event that said received response is such that permits said request, said distribution data generating means generates new distribution data by adding to the contents data said use control information containing information of the number of permitted times of use with value of the maximum number of times allowed set thereto.

36. A data use control device according to claim 29, wherein said distribution data comprises:

information of maximum number of permitted times of use represented by a hash value obtained by passing a predetermined initial value through a hash function a number of times equal to the maximum number of times that use is permitted and information of the number of times essentially already used represented by said predetermined initial value which is passed through a hash function each time used as said predetermined initial value as said use control information;

and wherein said use permitting means restricts use of said distribution data in the event that the hash value indicating information of said maximum number of times of use allowed and the hash value indicating information of said number of times of essential use become the same;

and wherein said control information updating means takes the hash value of the information of the number of times essentially already used, each time said distribution data is used, and updates.

\* \* \* \* \*